(12) United States Patent
Chowdhuri

(10) Patent No.: US 7,574,424 B2
(45) Date of Patent: Aug. 11, 2009

(54) DATABASE SYSTEM WITH METHODOLOGY FOR PARALLEL SCHEDULE GENERATION IN A QUERY OPTIMIZER

(75) Inventor: Sudipto R. Chowdhuri, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 199 days.

(21) Appl. No.: 10/711,931

(22) Filed: Oct. 13, 2004

(65) Prior Publication Data

US 2006/0080285 A1 Apr. 13, 2006

(51) Int. Cl.
*G06F 7/00* (2006.01)
*G06F 17/30* (2006.01)

(52) U.S. Cl. .............. 707/3; 707/1; 707/2; 707/8; 718/102; 718/107

(58) Field of Classification Search .............. None
See application file for complete search history.

(56) References Cited

U.S. PATENT DOCUMENTS

| | | | | |
|---|---|---|---|---|
| 4,870,568 A | | 9/1989 | Kahle et al. | 707/5 |
| 5,412,804 A | | 5/1995 | Krishna | 707/2 |
| 5,574,900 A | * | 11/1996 | Huang et al. | 707/1 |
| 5,590,319 A | | 12/1996 | Cohen et al. | 707/4 |
| 5,692,174 A | | 11/1997 | Bireley et al. | 707/3 |
| 5,806,059 A | | 9/1998 | Tsuchida et al. | 707/2 |
| 5,884,303 A | | 3/1999 | Brown | 707/3 |
| 5,926,809 A | | 7/1999 | Szalwinski | 707/3 |
| 5,940,289 A | | 8/1999 | Iwata et al. | 700/2 |
| 6,009,265 A | * | 12/1999 | Huang et al. | 707/3 |
| 6,026,394 A | | 2/2000 | Tsuchida et al. | 707/3 |
| 6,067,542 A | * | 5/2000 | Carino, Jr. | 707/4 |
| 6,101,495 A | | 8/2000 | Tsuchida et al. | 707/4 |
| 6,108,647 A | * | 8/2000 | Poosala et al. | 707/1 |
| 6,112,198 A | | 8/2000 | Lohman et al. | 707/3 |
| 6,192,359 B1 | | 2/2001 | Tsuchida et al. | 707/4 |
| 6,263,328 B1 | | 7/2001 | Coden et al. | 707/3 |
| 6,289,334 B1 | * | 9/2001 | Reiner et al. | 707/3 |
| 6,507,834 B1 | | 1/2003 | Kabra et al. | 707/2 |

(Continued)

OTHER PUBLICATIONS

"Dynamic Qery Evaluation Plans", by Goetz Graefe and Karen Ward, International Conference on Management of Data, Proceedings of the 1989 ACM SIGMOD international conference on Management of data, Portland OR, pp. 358-366, 1989.*

(Continued)

*Primary Examiner*—Tim T. Vo
*Assistant Examiner*—Jay A Morrison
(74) *Attorney, Agent, or Firm*—John A. Smart; G. Mack Riddle

(57) ABSTRACT

A database system with methodology for parallel schedule generation in a query optimizer is described. In one embodiment, for example, in a database system, a method is described for parallel optimization of a query, the method comprises steps of: generating a plurality of parallel plans for obtaining data requested by the query, the parallel plans including parallel operators for executing portions of the query in parallel; adjusting parallel operators of each parallel plan if necessary based on resources available for executing the query; creating a schedule for each parallel plan indicating a sequence for execution of operators of each parallel plan; determining execution cost of each parallel plan based on its schedule; and selecting a particular parallel plan having lowest execution cost for obtaining data requested by the query.

59 Claims, 19 Drawing Sheets

U.S. PATENT DOCUMENTS

| | | | | |
|---|---|---|---|---|
| 6,510,428 | B2 | 1/2003 | Tsuchida et al. | 707/6 |
| 6,564,205 | B2 | 5/2003 | Iwata et al. | 707/2 |
| 6,594,651 | B2 | 7/2003 | Kabra et al. | 707/2 |
| 6,625,593 | B1* | 9/2003 | Leung et al. | 707/2 |
| 6,691,101 | B2* | 2/2004 | MacNicol et al. | 707/2 |
| 6,732,084 | B1 | 5/2004 | Kabra et al. | 707/2 |
| 6,738,756 | B1* | 5/2004 | Brown et al. | 707/2 |
| 6,754,652 | B2* | 6/2004 | Bestgen et al. | 707/3 |
| 6,757,670 | B1* | 6/2004 | Inohara et al. | 707/3 |
| 6,910,032 | B2 | 6/2005 | Carlson et al. | 707/3 |
| 7,047,530 | B2* | 5/2006 | Lu | 718/102 |
| 7,051,034 | B1* | 5/2006 | Ghosh et al. | 707/100 |
| 7,137,115 | B2* | 11/2006 | Sakamoto et al. | 718/102 |
| 7,155,428 | B1* | 12/2006 | Brown et al. | 707/4 |
| 2002/0198872 | A1* | 12/2002 | MacNicol et al. | 707/3 |
| 2003/0014393 | A1* | 1/2003 | Kabra et al. | 707/3 |
| 2003/0187831 | A1* | 10/2003 | Bestgen et al. | 707/3 |
| 2005/0081210 | A1* | 4/2005 | Day et al. | 718/104 |
| 2005/0119999 | A1* | 6/2005 | Zait et al. | 707/3 |
| 2005/0120001 | A1* | 6/2005 | Yagoub et al. | 707/3 |
| 2005/0125427 | A1* | 6/2005 | Dageville et al. | 707/100 |
| 2005/0131879 | A1* | 6/2005 | Ghosh et al. | 707/3 |
| 2005/0131881 | A1* | 6/2005 | Ghosh et al. | 707/3 |
| 2005/0138015 | A1* | 6/2005 | Dageville et al. | 707/3 |
| 2005/0138047 | A1* | 6/2005 | Liu et al. | 707/100 |

OTHER PUBLICATIONS

"Volcano—An Extensible and Parallel Query Evaluation System", by Goetz Graefe, IEE Transactions on Knowledge and Data Engineering, vol. 6 No. 1, Feb. 1994, pp. 120-135.*

Srivastava et al., 'Optimizing Multi-Join Queries in Parallel Relational Databases', In Proceedings of the Second International Conference of Parallel and Distributed Information Systems, Los Alamitos, California, USA, Dec. 1993.*

U.S. Appl. No. 60/500,490, filed Sep. 6, 2003.*

Lee et al., A Simple On-Line Bin-Packing Algorithm, Journal of the ACM, vol. 32, No. 3, pp. 562-572, Jul. 1985.

Yao, Andrew Chi-Chih, New Algorithms for Bin Packing, Journal of the ACM, vol. 27, No. 2, pp. 207-227, Apr. 1980.

* cited by examiner

DATABASE SYSTEM WITH METHODOLOGY FOR PARALLEL SCHEDULE GENERATION IN A QUERY OPTIMIZER

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 31430 Bytes, created: Oct. 12, 2004 3:05:16 PM; Object ID: File No. 1; Object Contents: Source Code.

BACKGROUND OF INVENTION

1. Field of the Invention

The present invention relates generally to data processing environments and, more particularly, to a database system with methodology for parallel schedule generation in a query optimizer.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

One purpose of a database system is to answer queries requesting information from the database. A query may be defined as a logical expression over the data and the data relationships set forth in the database, and results in the identification of a subset of the database. Consider, for instance, the execution of a request for information from a relational DBMS. In operation, this request is typically issued by a client system as one or more Structured Query Language or "SQL" queries for retrieving particular data (e.g., a list of all employees earning more than $25,000) from database tables on a server. In response to this request, the database system typically returns the names of those employees earning $25,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The query optimizer is responsible for transforming an SQL request into an access plan composed of specific implementations of the algebraic operator selection, projection, join, and so forth. The role of a query optimizer in a relational DBMS system is to find an adequate execution plan from a search space of many semantically equivalent alternatives.

Relational database queries are broadly classified into simple transactional queries found in online transaction processing (OLTP) environments, and complex queries found in operational decision support system (DSS) environments. Although existing database systems are in wide use in DSS applications and in OLTP applications, there is a growing user demand for supporting both types of queries in a single system. Users need a solution capable of handling complex queries and also having the ability to process large data sets for both local and distributed systems. They are looking for a robust database server system platform for running mixed workload applications that demand superior performance for queries from both OLTP and DSS domains, sometimes across distributed and heterogeneous database servers. This environment is referred to as an operational decision support system (operational DSS), since it allows running complex queries as well as performing regular OLTP processing.

What is needed is an improved query optimizer that helps meet the demands placed on the database system in this type of environment which involves running complex queries as well as regular OLTP processing. Since it is not always possible to predict the type of workload, it is important to support both OLTP and DSS queries in the same configuration of the data processing system to efficiently support workloads of all types. One of the issues to be addressed in this type of processing environment is the ability to predict resource usage and adjust the query plan accordingly. The present invention provides a solution for these and other needs.

SUMMARY OF INVENTION

A database system with methodology for parallel schedule generation in a query optimizer is described. In one embodiment, for example, in a database system, a method of the present invention is described for parallel optimization of a query, the method comprises steps of: generating a plurality of parallel plans for obtaining data requested by the query, the parallel plans including parallel operators for executing portions of the query in parallel; adjusting parallel operators of each parallel plan if necessary based on resources available for executing the query; creating a schedule for each parallel plan indicating a sequence for execution of operators of each parallel plan; determining execution cost of each parallel plan based on its schedule; and selecting a particular parallel plan having lowest execution cost for obtaining data requested by the query.

In another embodiment, for example, a system of the present invention for parallel optimization of a database query is described that comprises: a search engine for generating a plurality of parallel plans which can be used for obtaining data requested by the query, the parallel plans including parallel operators for executing portions of the query in parallel; a parallel scheduler for adjusting parallel operators of each parallel plan if necessary based on resources available for executing the query and creating a schedule for the parallel plan indicating a sequence for execution of operators of the parallel plan; and a module for determining execution cost of each parallel plan based on its schedule and selecting a particular parallel plan having lowest execution cost for obtaining data requested by the query.

In yet another embodiment, for example, a method of the present invention is described for parallel optimization of a query requesting data from a database, the method comprises steps of: creating a plurality of operator trees for executing the query, the operator trees providing for execution of portions of the query in parallel; adjusting the portions of the query to be executed in parallel based on memory resources available for executing the query; generating a schedule for execution of each operator tree; and selecting the operator tree having lowest execution cost based on its schedule for executing the query.

DETAILED DESCRIPTION

Glossary

Figure 1:
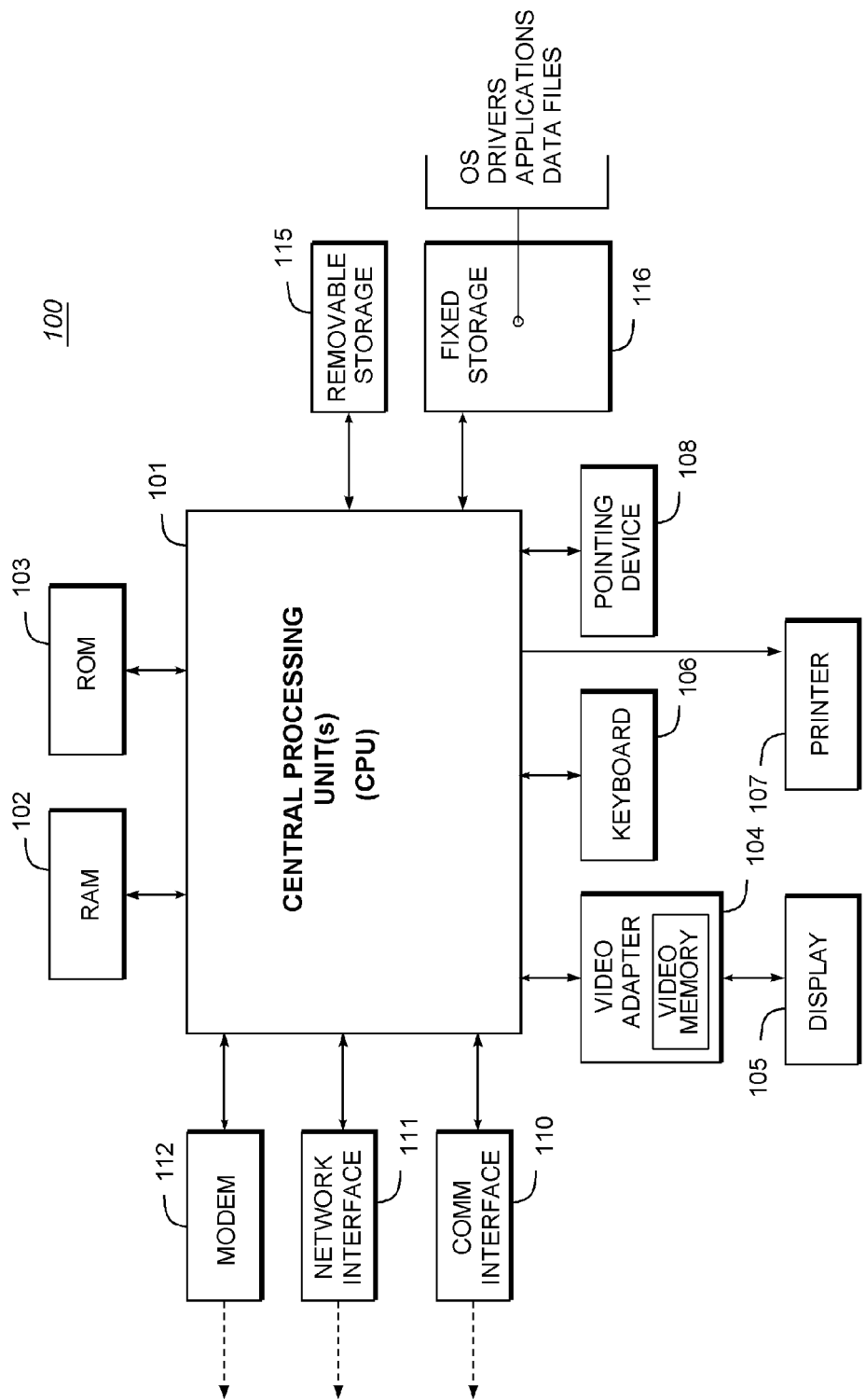
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bin-packing algorithms: The classical (one-dimensional) bin-packing problem is to pack a list of items L into a minimum number of unit-capacity bins. This problem arises in a wide variety of contexts and has been studied extensively since the early 1970s. Since this problem has been shown to be NP-complete, various heuristic bin-packing algorithms with guaranteed bounds on performance have been proposed. For further discussion of bin-packing algorithms, see e.g., Yao, C., "New Algorithms for Bin Packing", Journal of the Association of Computing Machinery, Vol. 27, No. 2, April 1980, pp. 207-227, the disclosure of which is hereby incorporated by reference for purposes of illustrating the current state of the art. Also see, e.g., Lee, C. C., et al, "A Simple On-Line Bin-Packing Algorithm", Journal of the Association of Computing Machinery, Vol. 32, No. 3, July 1985, pp. 562-572, the disclosure of which is also incorporated by reference for purposes of illustrating the current state of the art.

Core optimizer: The core optimizer is a component of the present invention that generates a set of optimal query plans that are then analyzed to select the best plan (i.e., the plan having most favorable execution costs).

Cost based pruning: Cost based pruning is a type of pruning technique where portions of a search space (tree shapes, permutations, access methods) are skipped purely based on cost estimates applicable to a query.

DSS: DSS refers to Decision Support System applications, which are database applications providing support for management decision makers who are dealing with semi-structured problems. DSS applications, such as those used in conjunction with providing a "data warehouse," are employed for analytical information processing. Instead of employing a simple query for pulling up records of a particular customer, a DSS query typically seeks information of a more general nature. A typical DSS query would, for instance, ask how many customers living in California purchased more than fifty dollars of merchandise over the past year. To satisfy a query of this nature, a database system would have to examine a large percentage of the actual warehouse data, not just a few records. In fact, the individual records found in a DSS query are often not of interest to the user. Instead, users are generally interested in trends—summary-level information. In typical operation, therefore, data reduction is performed on the query result by performing aggregation. In aggregation, the data records are grouped by one or more criteria of interest, such as grouped by state, by gender, by age, or the like. At the bottom of each group a summary is presented on the particular category of interest, such as total revenue (for that particular group). Here, the sum of a particular category is more of interest to the user than the detail records of the particular transactions which contributed to that sum.

Enforcer: The enforcer nodes (operators) generate properties such as ordering, partitioning, and the like. At each node in a search graph all useful properties are made available either through eager enforcement by explicitly applying the enforcer or derived from child nodes. In prior database server systems properties were obtained by explicitly enforcing them, in some cases unnecessarily, when available as side-products of child operators.

Equi-partitioned: Refers to two tables having compatible partitioning keys and partitioning criteria. If two tables have the same number of partition keys with compatible data types, and the partition criteria such as the intervals are the same for the range partitions, the two tables are considered equi-partitioned.

Global index: Global indexes refer to indexes on partitioned tables. A global index results when an index and the table have different partitioning strategies such that the index leaf pages of the global indexes point to more than one partition.

Hash based aggregation: A strategy for evaluating "GROUP BY" aggregates in which the group is looked up by a hash key on the grouping columns.

Hash partitioning: The partition to which a row belongs is selected by using a hash function on the partitioning attributes of the row.

Local indexes: When a table's index is partitioned the same way as its data, then such an index is called a local index.

Local server: The server/node where a given query originates.

Logical partitioning: Logical partitioning is a way to partition data into n units such that when a function f is applied to the keys of a given tuple t, it generates an ordinal number that maps to one and only one partition. In other words it is $0<=f(t,n)<=n-1$. An exception to this is round robin partitioning where such mapping does not hold.

Mixed workload: Relational database queries are broadly classified into simple transactional queries found in online transaction processing (OLTP) environments, and complex queries found in operational decision support system (DSS) environments. In a production environment, database systems can be configured to run either transactional or complex queries at the same time or at different times. Installations that support both of the above are referred to as "mixed workload" systems. Since it is not always possible to predict the type of workload, it is important to support both OLTP and DSS queries in the same configuration of the data processing system to efficiently support workloads of all types.

Node: A node refers to a database server in a homogeneous network of database servers which are connected together (e.g., coupled through the use of a Component Integration Services feature or other middleware).

OLTP: OLTP refers to OnLine Transaction Processing applications, which are in widespread use throughout business to handle transactions such as updating inventory, handling an ATM cash withdrawal, charging a bill to a customer, and the like. OLTP database systems typically process queries which find a single record, or just a few records. A typical query in an OLTP system, for instance, might be to retrieve data records for a particular customer, such as retrieving records in an airline reservation system for a particular account number. Thus, use of OLTP systems for retrieving data is largely limited to moment-to-moment operational needs, where the queries are relatively simple and the number of rows retrieved (relative to table size) is few. In other words, OLTP systems have been optimized for this task of finding a "needle in a haystack"—that is, finding one or few records which meet a given query condition.

Ordered set: In an ordered set the order of the members of a set are defined (e.g., a specific order (b, a) in a set containing members a, b). Ordered and unordered sets are used to model physical properties such as ordering and partitioning.

Ordering: Refers to a specific sequence (ascending or descending) of attributes in a result set as would occur from an index scan or a sort.

Partition elimination: Given a query that has predicates on the partitioning keys, it is possible to find out which partitions qualify a given predicate. However, predicates that are currently useful for partition elimination must qualify as conjunctive or disjunctive predicates on a single table of the form: col relop <literal>.

Partitioning key: A search condition that evaluates to partition specification. The set of columns participating in the key specification is known as the partitioning key.

Physical operator: An algorithm implementing a logical operator, (e.g., scan, sort-merge join, nested loop join, and so forth).

Physical property: A property that is associated with a physical operator and depends on the actual algorithm implemented by that operator and on the physical properties of its children (hence, recursively, on the physical operators in the sub-plan). For example, the ordering (from an index scan or sort) of the outer child is usually inherited after subsequent join operators are evaluated, but each plan in an equivalence class has potentially different orderings depending on the underlying operators used in the sub-plan Pop (physical operator).

Property model: The present invention introduces an optimizer property model designed to represent efficiently all combinatorics of orderings so that maximal use is made of any ordering available from an index scan or a sort node. Partitioning is another property that is modeled in the optimizer of the present invention.

Pruning: Is a technique of search space control in which only promising sub-plans are retained (i.e., the ones that could be part of the best total plan). The optimizer uses cost based pruning and heuristics based pruning.

Range partitioning: In this table-partitioning scheme, a data set for one or more attributes is partitioned on the value range. Thus, every row is pinpointed to a given partition.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the Structured Query Language (SQL), defined below.

Remote node: A remote node refers to a node/server in a homogeneous network of database servers which are connected together other than the local node. A heterogeneous server in the network is referred to as a remote server rather than a remote node.

Round robin partitioning: A scheme that is best suited for load balancing. The data set is distributed in a round robin fashion without any attention to where a data value ends up. There are no semantics associated with such a partitioning scheme (i.e., given a row of the data set, one cannot say with certainty as to which partition a given row would belong to).

Search engine: The search engine refers to a component of the query optimizer of the present invention that generates and evaluates alternative execution plans. The search engine includes as three components: search criteria, search space, and search strategy. The search engine constitutes a major component of the core optimizer.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Stored table: A fully materialized table, stored tables are either of persistent base tables, transient worktables, or table value constructors.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

Unordered set: A power set of the members in the set, typically associated with a sort node or repartition node in which the optimizer does not want to predetermine the exact order of the attributes. The unordered set includes all subsets with all combinations and all cardinalities (e.g., {(a), (b), (a,b), (b,a)}).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
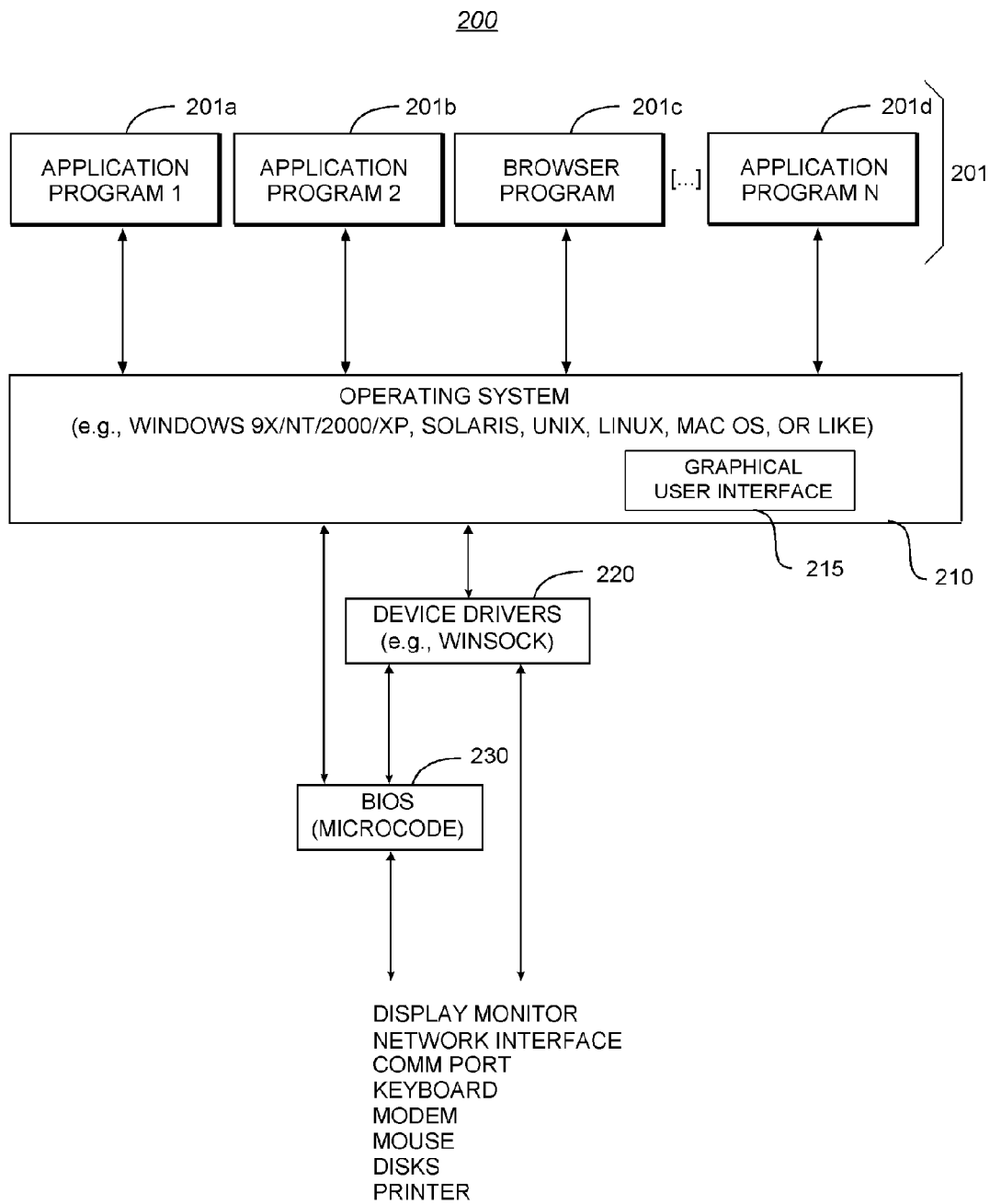
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
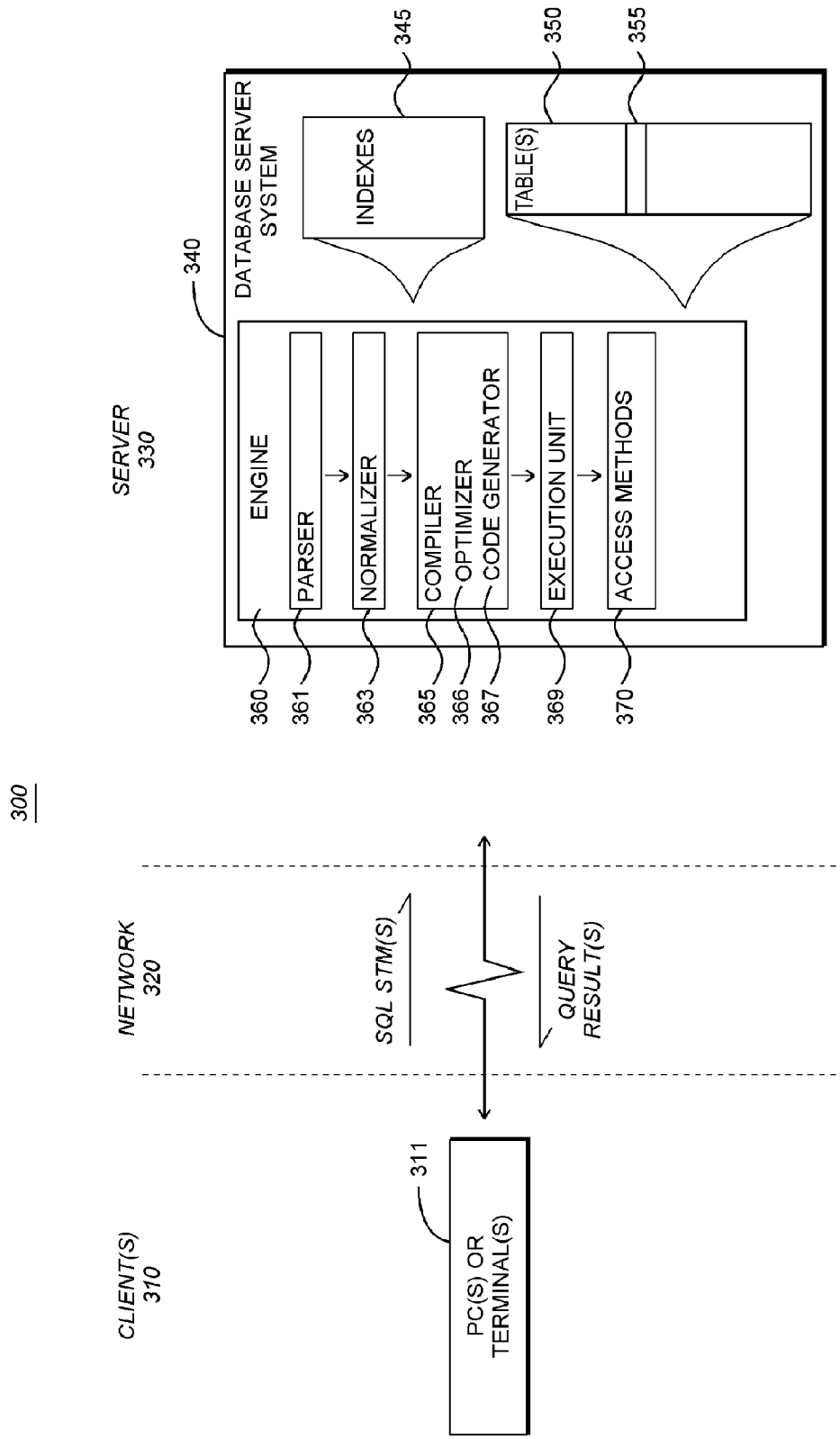
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft (registered trademark) Windows client operating system (e.g., Microsoft (registered trademark) Windows 95/98, Windows 2000, or Windows XP).

The database server system 340, which comprises Sybase (registered trademark) Adaptive Server (registered trademark) Enterprise (available from Sybase, Inc. of Dublin, Calif.) in an exemplary embodiment, generally operates as an independent process (i.e., independently of the clients), running under a server operating system such as Microsoft (registered trademark) Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase-branded database servers and client/server environments generally, see, e.g., Nath, A., "The Guide to SQL Server", Second Edition, Addison-Wesley Publishing Company, 1995. For a description of Sybase (registered trademark) Adaptive Server (registered trademark) Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists one or more "servers" (e.g., database servers) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Parallel Schedule Generation in a Query Optimizer

Horizontal and Vertical Parallelism

The present invention provides a database server system solution suitable for operational DSS systems that demand superior performance for queries from both OLTP and decision support domains. The present invention includes methodology for parallel query execution. The following discussion explains how parallelism is achieved in the system of the present invention.

In a relational database system, a user query is broken down into a relational algebra that is comprised of algebraic operations. Each of these algebraic operations is thought to be a basic operator (i.e., an execution primitive). Depending upon the data-partitioning scheme, a query execution engine runs several instances of a given operator to work on different partitions, or allows operators to be executed in parallel. The ability to employ multiple resources like CPUs or disks simultaneously on more than one operator is termed vertical parallelism. Within each operator one can employ parallelism if the data set that it needs to look at has some disjoint property about it. In the present invention this is achieved through the use of data and index partitions. The ability to run multiple instances of the operators on different data sets located across different storage units is called horizontal (or partitioned) parallelism. Similarly, a tree of operators can run independently of another tree of operators. Partitioning of execution is extremely useful in operational DSS queries where large volumes of data are being scanned, joined, and sorted. Consider the following query example:

1: /* Example */
2: select state, sum(order_item)
3: from customer c, order o
4: where o.customer_id=c.customer_id
5: group by state
6: order by sum(order_item)

In the above example two tables, the customer table and the order table, are being scanned. This is followed by a join operation to get the orders that belong to a particular customer. A group by (also referred to herein as a GroupBy) operation groups the orders by state and sums the order amount for each state. Finally, the orders for each of the states are sorted so that they appear in the order of the sum.

By using horizontal parallelism, execution of each query operation is divided into sub-tasks and executed in parallel across multiple storage units and CPUs. Therefore, if the customer table is partitioned across several disk devices that can operate in parallel, the database management system (DBMS) initiates multiple scans to be performed in tandem. Vertical parallelism assists in the execution of the query by allowing intermediate results to be pipelined to the next operator. In this case, while data is scanned, it can be sent to the join operation, and while the join operation is done it could be further piped to the grouping operation. This form of inter-operator parallelism is the pipelined form. For example, to begin with an operator A can produce data at its output which then becomes an input source of data to another operator B. Operator A, the producer of the data, and operator B, the consumer of the data, work in tandem. This two-step parallelism, horizontal and vertical, is of great significance in parallel query processing.

Parallel Query Execution Using Iterators

The present invention provides for encapsulation of query results using iterators. These iterators are self-contained software objects that accept a stream of rows from one, two, or multiple data sources. The role of an iterator is to process many iterations of a data set across many nodes in serial or parallel. Iterators do not know what the source of a data stream is; whether it is the contents of a disk file, a network connection, or even another iterator. For each iteration of a data set, the iterator applies a predefined behavior to the data set being processed, manipulating the data according to the specification of that iterator. For example, scanning database rows from a database on disk can be the behavior of one type of iterator. By using iterators complex queries (e.g., such as the one shown in the above example) are structured by stringing together appropriate operators into a tree structure.

Figure 4:
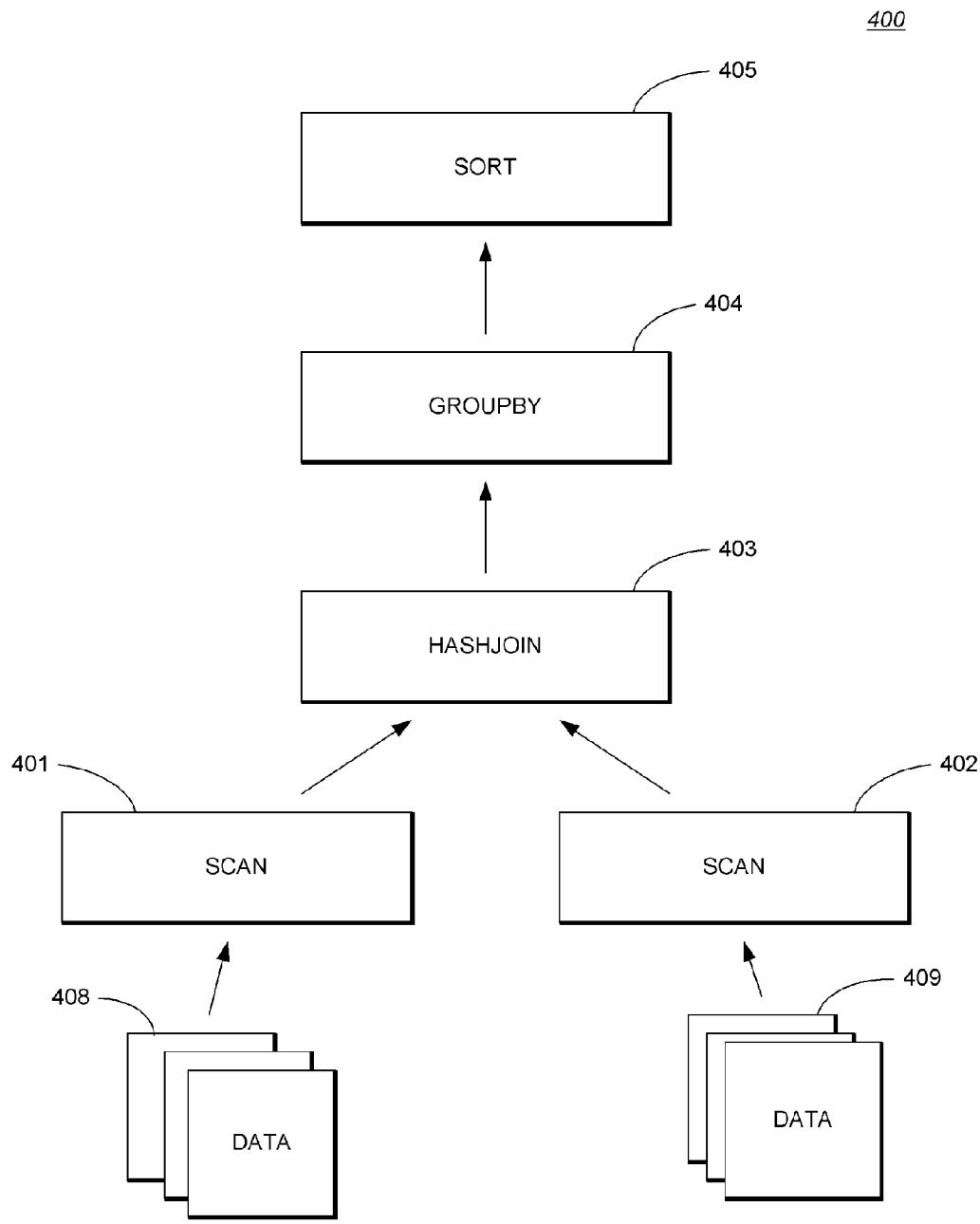
FIG. 4 is a block diagram of a serial operator tree illustrating the use of iterators to structure complex queries.

FIG. 4 is a block diagram of a serial operator tree 400 illustrating the use of iterators to structure complex queries. As shown, customer and order tables (data 408, 409) are scanned by two separate scan iterators, 401 and 402, respectively. Once these tables are scanned, results are sent to the hash join iterator 403 to be matched. The joined rows are then sent to the grouping iterator (GroupBy) 404 that performs a grouping operation based upon the state codes. Finally, results from the grouping (GroupBy) iterator 404 are passed to the sort iterator 405. The sort iterator 405 sorts the results.

Among the key benefits of using iterators is that the iterators are self-contained entities that maintain their own states, and they can be easily duplicated for horizontal parallelism across CPU and I/O threads.

Pipelining with Repartitioning

Another component utilized in the present invention is a component called an exchange operator which is responsible for parallelizing an operation. An exchange operator (also referred to herein as an "Xchg" operator) is simply another class of iterator that is more like a control operator. Its behavior is to affect parallelism. The query optimizer of the present invention inserts exchange iterators at suitable points in the operator tree to take advantage of parallelism wherever it may prove to be beneficial.

The exchange operator marks the point in the operator tree where all of the operators in a subtree are executed by a newly created producer process. The subtree that is executed by the producer process commences at the point of the exchange operator and continues down the operator tree structure to the next exchange operator (if there is one) or a leaf node. The exchange operator now becomes a consumer for the data produced below the exchange. Thus the exchange operator permits concurrent execution of complex query evaluation plans in multiple cooperating processes. The exchange operator allows pipelining of intermediate results from one set of operators (i.e., producer tasks) and initiates another set of operators to process the next request (i.e., consumer tasks). The exchange operator takes the data from the producer tasks and is capable of redistributing data for a different degree of parallelism in its consuming tasks. This is extended to redistribution of data to multiple servers on a cluster for processing the data. The exchange operator hides the actual intricacies of pipelining and rerouting data. For example, once a scan operator starts processing data the exchange operator immediately repartitions the data and redistributes it to the hash join operator (iterator) as shown at FIG. 4.

Figure 5:
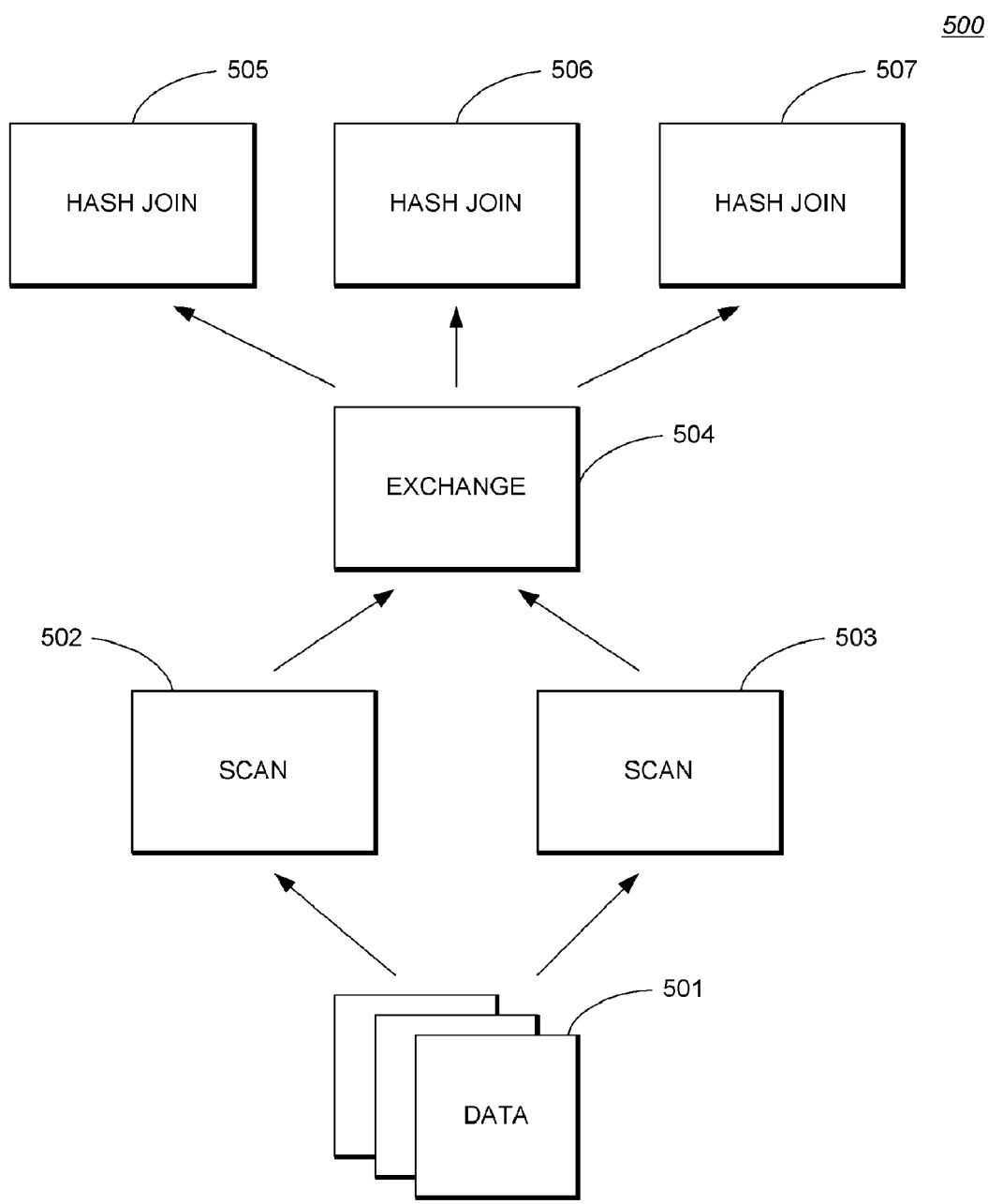
FIG. 5 is a block diagram of a parallel operator tree fragment illustrating how an exchange operator is used to parallelize a join operation.

FIG. 5 is a block diagram of a parallel operator tree fragment 500 illustrating how an exchange operator (iterator) is used to parallelize a join operation. (Note that the GroupBy and Sort operators depicted in FIG. 4 are not included in FIG. 5 to simplify the diagram.) In FIG. 5, a customer table (data) 501 is scanned in parallel by two threads, 502 and 503, respectively. The scan threads 502, 503, which are spawned by the exchange operator 504, capitalize on horizontal parallelism. The data is then repartitioned on-the-fly by a routing function, which hashes on the joining attribute. The hash join is the consumer of this data and it is executed in parallel by three threads 505, 506, 507.

While the two scan operator threads 502, 503 produce data, the three hash join operators 505, 506, 507 consume data for the purpose of initiating the build. It should be noted that one can easily substitute these threads for servers on other nodes while still using this parallel execution mechanism.

Parallel Optimization and Resources

Before describing the parallel query optimization methodology of the present invention in detail, some of the aspects of parallel optimization and a description of the resources will first be described. In addition, the fundamental architecture for parallel optimization is discussed.

A general goal of a query optimizer is to speed up the process of executing a query and returning the results. In general terms, speeding up a query (i.e., reducing query response time) can be achieved in two different ways. A first way to achieve the goal of reducing response time is by reducing the total amount of work that needs to be done in executing the query. A second way to achieve this goal is divide (or partition) the work that needs to be done in executing the query among multiple processors. This can allow a given query to take advantage of unutilized (or underutilized) resources. The system and methodology of the present invention minimizes query response time by judiciously interleaving and balancing the execution primitives to take advantage of the available resources, with the assumption that throughput remains unchanged. The result provided by the parallel execution strategy of the present invention is a substantially reduced query response time.

One of the deterrents to fulfilling this objective of improved query response time is that there may be some basic limits on how work can be partitioned. The available parallelism may be such that it is difficult to partition work evenly amongst available processors. The response time for a given query depends on the time at which all of the processors have been able to complete their assigned tasks, which in turn means that any kind of skewed processor loads may reduce the benefits provided by a parallel execution strategy. In some cases, processor fragmentation, which essentially leads to the inability to allocate sufficient resources at a required time, causes a significant delay in the start-up of parallel subtasks.

Before describing how the present invention parallelizes a query, the possible ways of parallelizing a query will be briefly described. Alternatives for parallelizing a query include the following: (1) the parallel optimization proceeds while plans are generated for serial execution; (2) the best serial plan is taken and optimized for parallel execution; or (3) perform minimal optimizations at compile time and devise a run time optimization scheme.

In the third alternative, minimal optimizations are performed at compile time. One disadvantage of this approach is that execution time (run time) optimization has significant overhead because it has to address problems that are unsolvable in polynomial time. Additionally, it also has drawbacks in being able to predict actual resource usage (i.e., any information is instantaneous and does not reflect the steady state of the system). However, the other two alternatives (parallel optimization with plans generated for serial execution and serial plan optimized for parallel execution) appear to be at two extreme ends of the spectrum. It is difficult, if not impossible, to determine which of these alternatives is a better choice, or if there is another reasonable approach.

The present invention includes methodology for establishing cost criteria that enables one to determine with reasonable accuracy whether a parallel plan (e.g., plan P1) is better than an alternative parallel plan (e.g., plan P2). This cost criteria involves a cost vector rather than a single scalar cost. Plan P1 is cheaper than plan P2 if the cost vector of plan P1 is cheaper than the cost vector of plan P2 (i.e., plan P1 has less cost than plan P2 in each vector dimension). If plan P1 is cheaper than plan P2 in each vector dimension, plan P2 is pruned. Otherwise, both plan P1 and plan P2 will have to be kept. This reduces the pruning efficiency in the optimizer and the net result in many cases is a set of parallel plans. At this point, both parallel plans are taken, a schedule for each plan is determined from available resources, and the actual execution schedules for the pipelines in the query plan are computed. Schedules are discussed later in this document, but briefly, a schedule is a tree of dependent pipelines that are activated bottom up. All child siblings are activated first, and once their resource consumption has been met and tapered off, the parent is activated. This also establishes a lower bound on response time of each of these plans. The cheapest plan is selected as the final plan.

As described above, determining that a given parallel plan is better than another plan involves using appropriate cost metrics. The present invention defines new costing units in order to overcome the problem of evaluating parallel plans. These new costing units are called "average time", "critical path", and "volume".

Average time indicates the average amount of work done by each processor on a machine. This includes time spent in processing instructions, disk I/O, and any network I/O. Critical path models response time. It indicates the maximum time taken by any of the operators in the plan tree. Volume models resource usage for a certain time frame. It is the product of resource usage (e.g., memory) and the time for which the resource is in use.

Plans are generated using a partitioning property as a criterion for each operator. In each of the optimization blocks there is already a pre-computed notion of what partitioning is useful and on what columns. At each stage of plan building, this notion of partitioning as a property to perform an efficient relational operation is taken advantage of wherever possible. In the present invention the query optimizer determines the most efficient way to partition data such that it minimizes the amount of work done by the query.

Preemptable and Non-Preemptable Resources

There are two general kinds of resources involved during the schedule generation process: preemptable resources (PS)

and non-preemptable resources (NPS). Preemptable resources include disks, CPU, network interfaces, and the like. Central to the determination of a resource as preemptable is that the resource can be time sliced between operators at a very low overhead. For such resources, operators specify an amount of work, which is equivalent to the effective resource utilization time that can be stretched over the operator's execution time.

Non-preemptable resources include memory buffers, whose time-sharing among operators introduces prohibitively high overheads. An underlying assumption is that the cost of time-sharing memory by more than one process using virtual memory is unusually high. For such resources a rigid capacity requirement is specified and maintained throughout the execution.

The present invention uses the concept of multidimensional PS and NPS resources in developing a cost model with sufficient flexibility for parallel query execution. Query operators are represented as pairs of vectors with one dimension per PS and NPS resource, respectively. It can be observed that the inclusion of NPS requirements gives rise to trade-offs (i.e., in some instances increasing the degree of parallelism of an operator reduces the NPS requirement, while decreasing it allows the parallelism to be kept fairly coarse-grained so that the communication cost does not overwhelm the execution). When the degree of the operator is established, a model for multiple-operator clones running concurrently in a pipeline, and related scheduling requirements, is approximated by implementing well-known "bin-packing" algorithms.

Resource Usage Model

In an environment in which the present invention operates it is assumed that there is no time-sharing overhead for preemptable resources (PS). Slicing a PS among multiple operators does not introduce additional resource costs. Additionally, it is very difficult to find out the actual periods of usage for a PS resource; hence it is assumed that there is uniform usage of a preemptable resource by an operator, spread over the execution of the operator.

The usage of a single resource is modeled using two parameters, T and W, where T is elapsed time and W is work measured as the effective time for which the resource is kept busy by the operator. It is logical to assume that such a resource is kept busy for W/T of the time, although it is hard to predict when the busy periods occur. Using the above assumptions regarding preemptable resources, the effects of resource sharing can be quantified.

A straightforward quantification of the effects of resource sharing is calculated as follows. The resource usage model, defined as the usage of an isolated operator of a site comprised of d PS resources and s NPS resources, is represented by the triple ($T^{seq}$, W, V). $T^{seq}$ denotes the (stand alone) sequential execution time of an operator. W is a d-dimensional work vector whose components denote the work done on individual PS resources (i.e., the effective time for which a resource is being used by the operator). V is an s-dimensional demand vector whose components denote NPS resource requirements of the operator throughout its execution.

In this model there is a fixed set of system resources. The different dimensions of W may include CPU, disk-1, network interface, and the like. Thus, W may be represented as a vector (e.g., (10, 12, 12)) corresponding to resource usage for each dimension expressed in some work units.

The stand alone time $T^{seq}$ or $T^{seq}(W)$ is a function of the individual components of W and the amount of overlap achieved between processing at different resources. This overlap is a system parameter (similar to the buffering architecture for disk I/O) and the algorithm implementing the operator. It is evaluated using experimental evaluation. In the currently preferred embodiment of the present invention a value of 0.8 is used. Those skilled in the art will appreciate that a different value could also be used, if desired. An important constraint for $T^{seq}$ is that it can never be less than the amount of work done on any single resource, and it can never exceed the total amount of work done by all the resources added together. The operator's NPS resource requirement (V) depends primarily on the size of its inputs and the algorithm used to implement the operator. The operator's work requirement (W) depends on both of these parameters as well as its NPS resource allotment V.

Memory is a good example of a non-preemptable resource and it is the only resource currently tracked in the NPS resource vector. The system also tracks the number of parallel units employed, which is a sum of the number of CPU threads and I/O threads that can run in the system in a concurrent fashion. This is the overall parallel degree for the system, beyond which scale up is severely affected. The number of parallel units employed is denoted by PX, where PX=number of CPUs+number of disks that can be run in parallel. In the current preferred embodiment PX is set to the number of CPUs.

Another relevant concept is "resource granularity", which tells one the percentage of NPS that can be used by a given query. In the currently preferred embodiment of the present invention this is the percentage of memory used by a given query. Assuming uniform memory distribution, in calculating this limit a new parameter is defined which is called "operator resource granularity" or "ORG" as follows:

ORG=(Resource granularity/100)/(number of operators in the operator tree).

This number (ORG) is useful for generating the schedule. The resource vectors are used to compute the three cost dimensions (i.e., average cost (AC), critical path (CP), and volume (VC)). The core optimizer (search engine) uses these components for cost based pruning of sub-plans resulting in a set of plans. This set of plans is then used as an input to the parallel scheduler. The cost dimensions are calculated as follows: V=(vector sum of TS resources for all operators); AC=$T^{seq}$(V)/PX; CP=max component of V; and VC=Summation (NPS(op)*CP(op)); where NPS(op) is the NPS resource (memory) used by an operator.

Parallel Scheduler

The parallel scheduler of the present invention has two important functions: (1) it adjusts query plans based on available worker processes; and (2) it looks at a set of parallel plans annotated with resource usage. Based on the total resources available for a query, it finds the best plan based on its response time. A "parallel schedule" consists of an operator tree and an allocation of system resources to these operators. One reason why resource management is complex in parallel optimization is because of its multi-dimensional facets.

System Components

Figure 6:
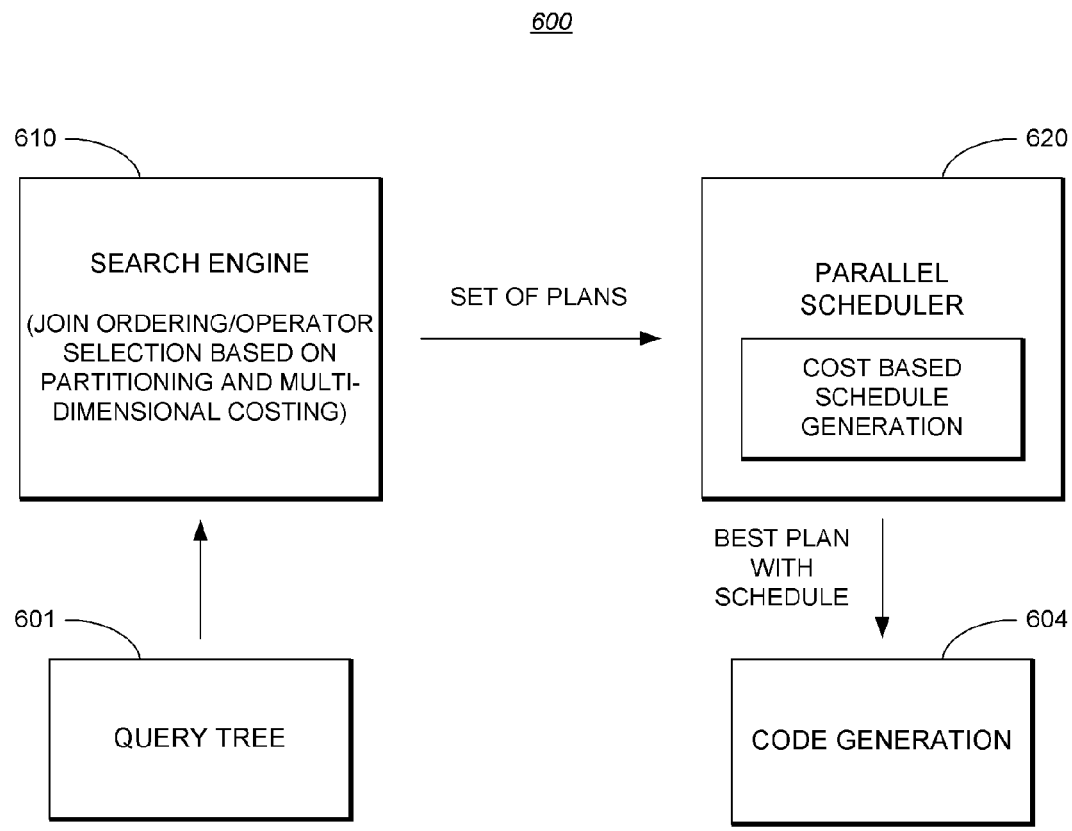
FIG. 6 is a high-level functional diagram illustrating the two phases of optimization performed in the system of the present invention.

FIG. 6 is a high-level functional diagram 600 illustrating the two phases of optimization performed in the system of the present invention. As shown, a query tree 601 is received by a search engine 610. The search engine 610 is a core component of the query optimizer that generates and evaluates alternative execution plans. In the first phase of optimization, the search engine 610 generates a set of plans including join ordering/operator selection based on partitioning and multi-dimensional costing. The set of plans generated by the search engine 610 is then provided to the parallel scheduler 620. The parallel scheduler 620 is responsible for cost based schedule generation as hereinafter described. The parallel scheduler 620 receives as input a set of operator trees (plans) with resource vectors and known partitioning. As shown at FIG. 6, the output from the parallel scheduler 620 is a best operator tree with its schedule that is used by the code generator 604 as the basis for generating the query execution plan.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Two important aspects of the parallel scheduler of the present invention are the compile time adjustment process and the schedule generation process. In the compile time adjustment process, each of the operator trees of a set of input operator trees (plans) is adjusted for available worker processes at compile time. This adjustment is needed to ensure that an operator tree does not exceed the maximum configured worker processes. In the schedule generation process, the adjusted operator trees are utilized to generate a schedule. Based on the schedule the completion time of each complete operator tree is evaluated. The complete operator tree that finishes first (i.e., has the fastest completion time) is deemed to be the cheapest and is selected as the best plan for execution of the query.

Figure 7A:
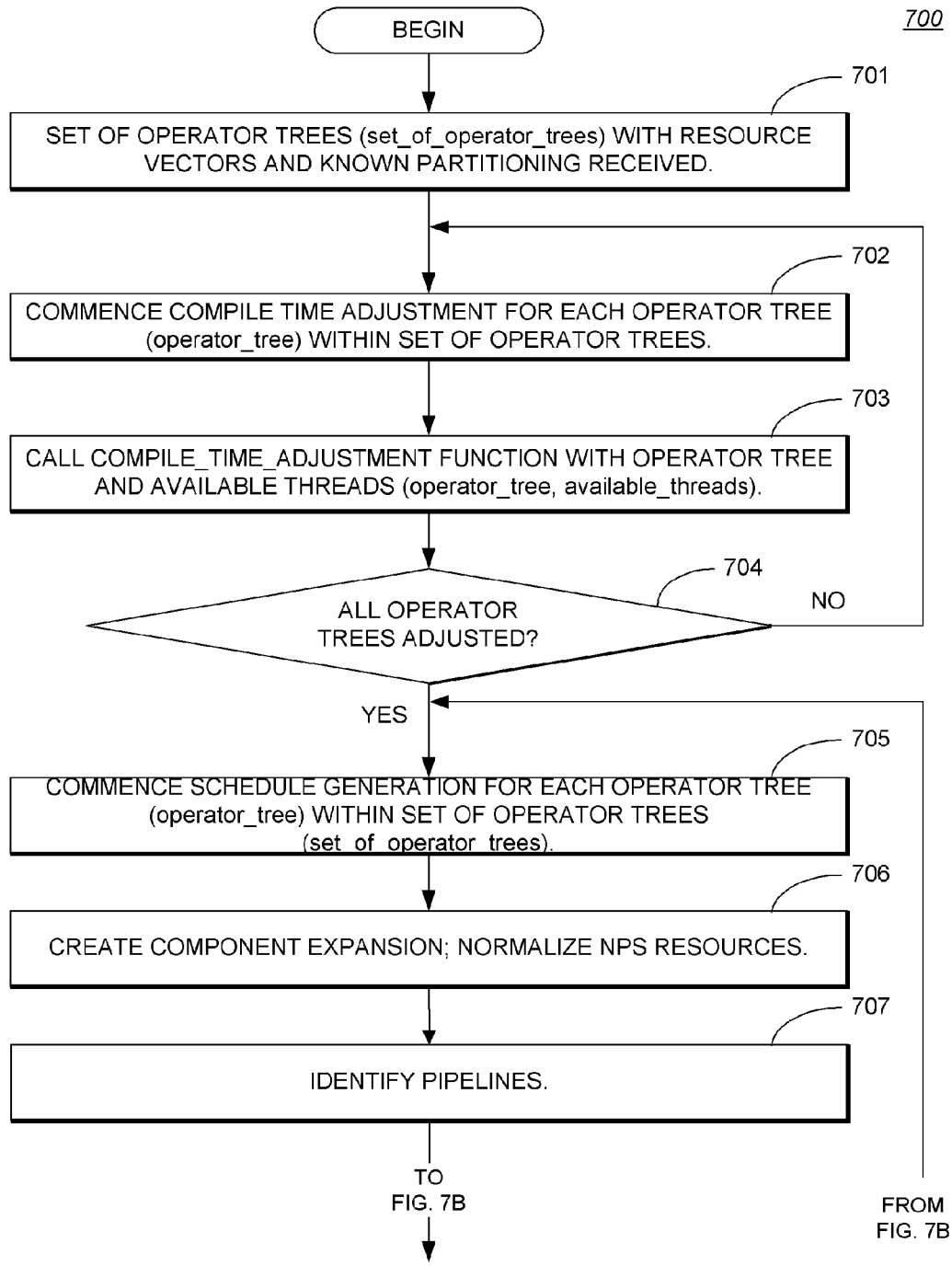
FIGS. 7A-B comprise a single high-level flowchart illustrating the parallel scheduling methodology of the present invention.
Figure 7B:
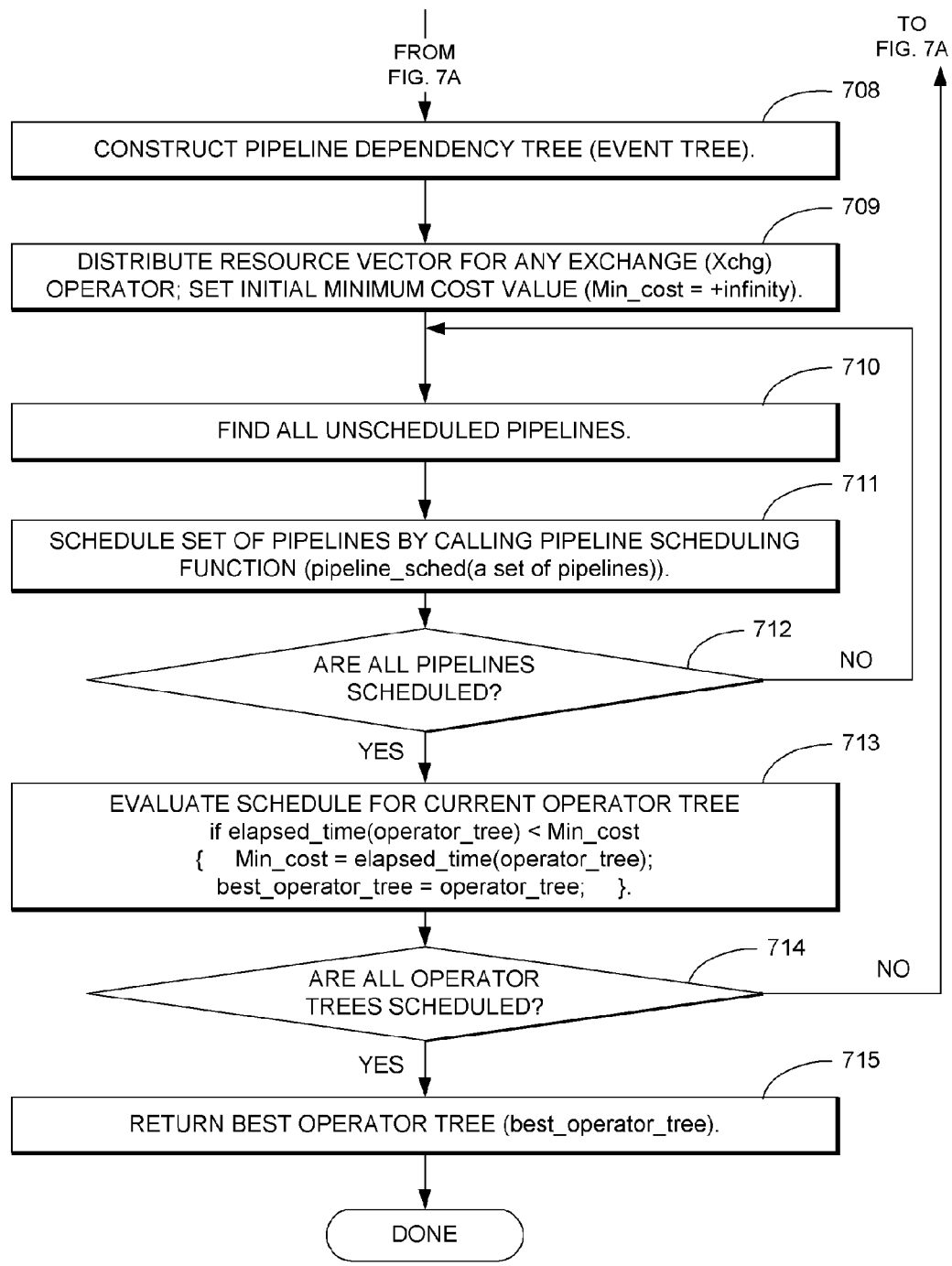

FIGS. 7A-B comprise a single high-level flowchart 700 illustrating the parallel scheduling methodology of the present invention. As shown, at step 701 input consisting of a set of operator trees (set_of_operator_trees) with resource vectors and known partitioning is received by the scheduler. At step 702, the compile time adjustment phase commences by examining each operator tree (operator_tree) within the input set of operator trees. At step 703, a compile time adjustment function (compile_time_adjustment) is called with the current operator tree (operator_tree) and available threads (available_threads) as parameters. The compile time adjustment function is described below in this document. After the compile time adjustment of an operator tree, a determination is made at step 704 as to whether all operator trees have been adjusted. If there are additional operator trees remaining in the set, steps 702-704 are repeated. When all operator trees are adjusted, the compile time adjustment process is complete and the method proceeds to the schedule generation process.

At step 705, the schedule generation process commences for each operator tree (operator_tree) within the input set of adjusted operator trees (set_of_operator_trees). At step 706, a create component-expansion routine is called and NPS resources are normalized. Component-expansion is described in more detail below, but the basic idea is to expand (split) NPS resource intensive operators into further operators to separate out the resource intensive components from those that are not resource intensive. Normalization of NPS resource refers to the fraction of NPS resource used by the operator to the total available resource at that server for a given query. Next, pipelines are identified at step 707. At step 708, a pipeline dependency tree (also referred to as an "event tree") is constructed. At step 709, resource vector for any exchange (Xchg) operator is distributed and an initial value is set for minimum cost (Min_cost=+infinity). At step 710, all unscheduled pipelines are found. At step 711, a set of pipelines is scheduled through a call to a pipeline_sched function with a set of pipelines as input. Then a determination is made at step 712 as to whether all pipelines are scheduled. If all pipelines have not been scheduled, steps 710-712 are repeated. When all pipelines are scheduled, the method proceeds to step 713.

At step 713, the schedule for the current operator tree is evaluated. More particularly, a determination is made as to whether the elapsed time (or completion time) of the current operator tree is less than the minimum cost (Min_cost). The minimum cost is equal to the best completion time previously found. If the elapsed time of the current operator tree is less than the minimum cost, the current operator tree is saved as the best operator tree (best_operator_tree) and the elapsed time of the current operator tree is made the new minimum cost (Min_cost=elapsed_time(operator_tree)).

At step 714, a check is made to determine if all operator trees have been scheduled. If not, steps 705-713 are repeated for one or more additional operator trees. When all operator trees have been evaluated, the best operator tree (i.e., the operator tree having the most favorable completion time) that was found is returned as provided at step 715. The scheduling process is then complete. The above methodology is described below in more detail.

Compile Time Adjustment

Figure 8:
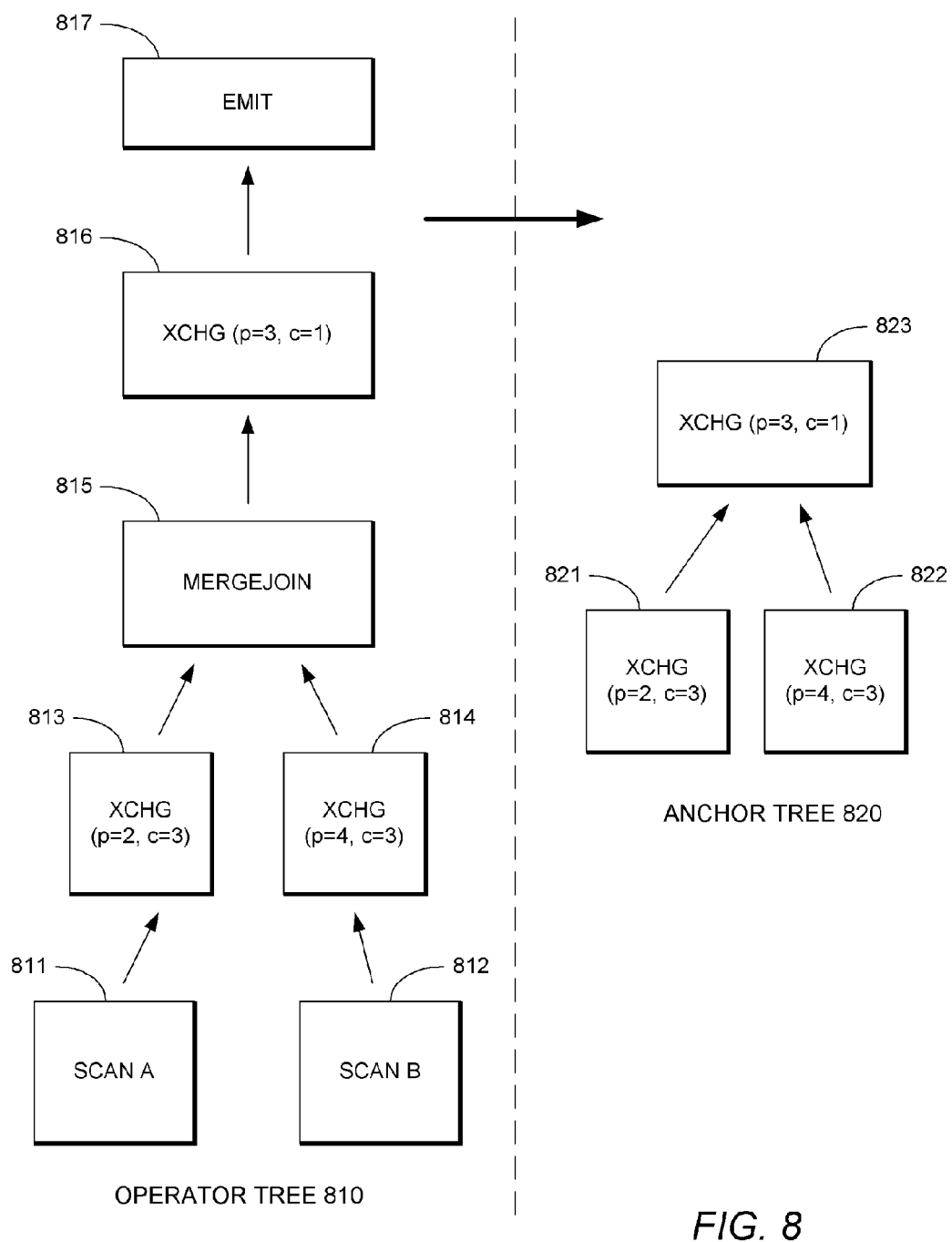
FIG. 8 is a block diagram illustrating an example of the transformation of an operator tree to an anchor tree.

As described above, compile time adjustment is performed on each operator tree. The methodology of the present invention provides for creation of an anchor tree, which is an operator tree with only "exchange" (Xchg) nodes. FIG. 8 is a block diagram illustrating an example of the transformation of an operator tree to an anchor tree. As shown, the operator tree 810 includes seven nodes (nodes 811, 812, 813, 814, 815, 816, 817) while the anchor tree 820 includes only Xchg nodes 821, 822, 823. Each of the Xchg nodes 813, 814, and 816 has a number of producers marked as "p" and a number of consumers marked as "c". For example, the Xchg node 813 has "p=2" indicating that there are two producers and "c=3" indicating three consumers.

In the currently preferred embodiment of the present invention each Xchg node is inspected and marked to determine whether it can or cannot be adjusted. Xchg nodes that have as their descendant node "attribute sensitive operators", such as joins, grouped aggregation, and the like, are not adjusted. This is because if one thread reads more partitions, the resultant partitioning in the stream is altered and does not work correctly with attribute sensitive operators. For example, two threads reading three partitions joined to one thread reading three partitions may give incorrect results.

Each Xchg node in the anchor tree is put into a priority queue, which is ordered according to the cost of the maximal subtree rooted at that Xchg node up to the next Xchg node or a leaf node. The least expensive Xchg node is placed at the head of the priority queue. If a given Xchg node is adjustable, the method removes the Xchg node, reduces its thread count, adjusts the cost based on the new thread count, and inserts it into the priority queue. If an Xchg cannot be adjusted, it is simply popped out of the priority queue. The process repeats until the required thread count limit is reached or there are no more Xchg nodes to adjust. The last part of the compile time adjustment process provides for re-adjusting the partitioning based on the new thread counts, since this entails altering the partitioning of operators.

Figure 9A:
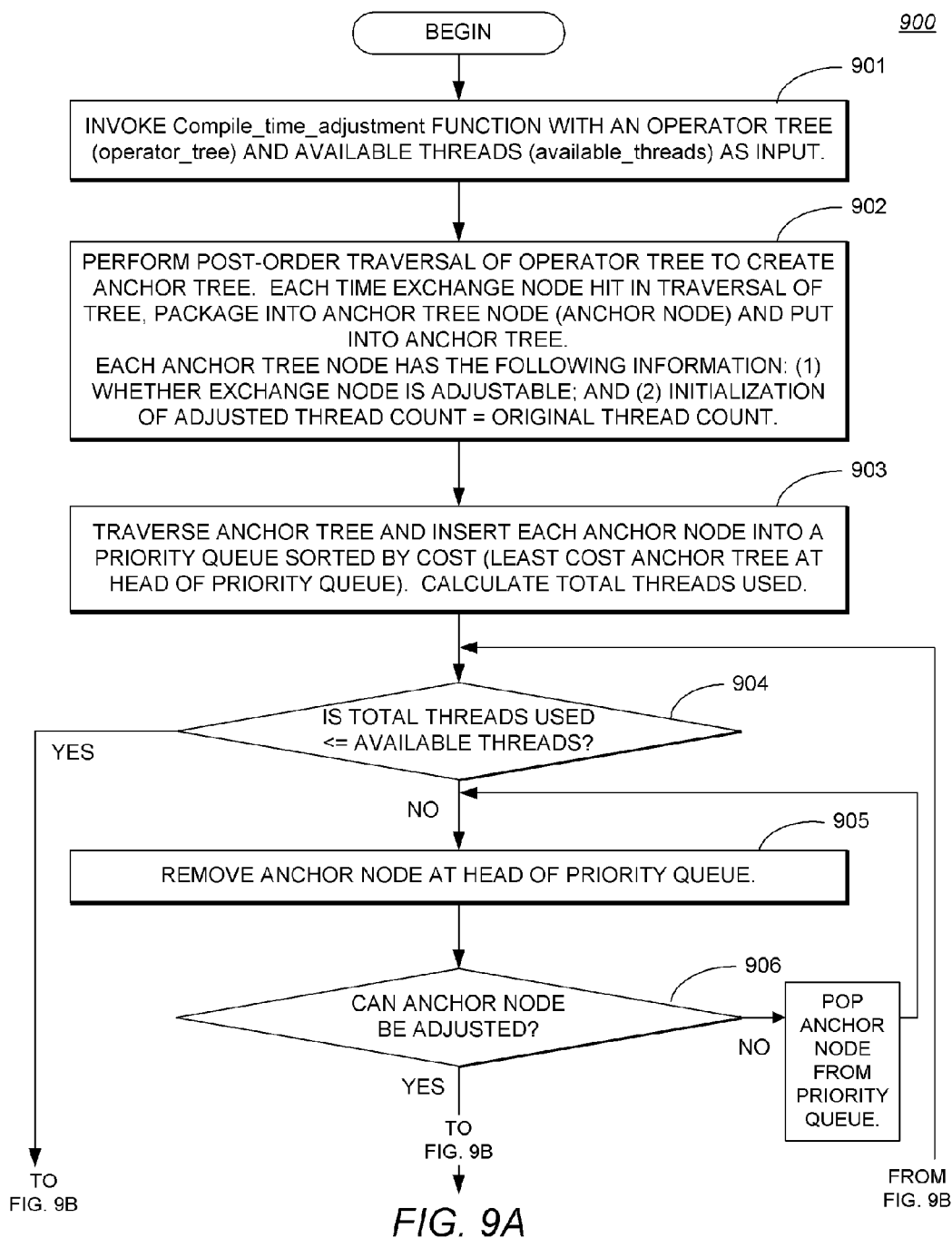
FIGS. 9A-B comprise a single flowchart illustrating the method steps of the compile time adjustment process of the present invention.
Figure 9B:
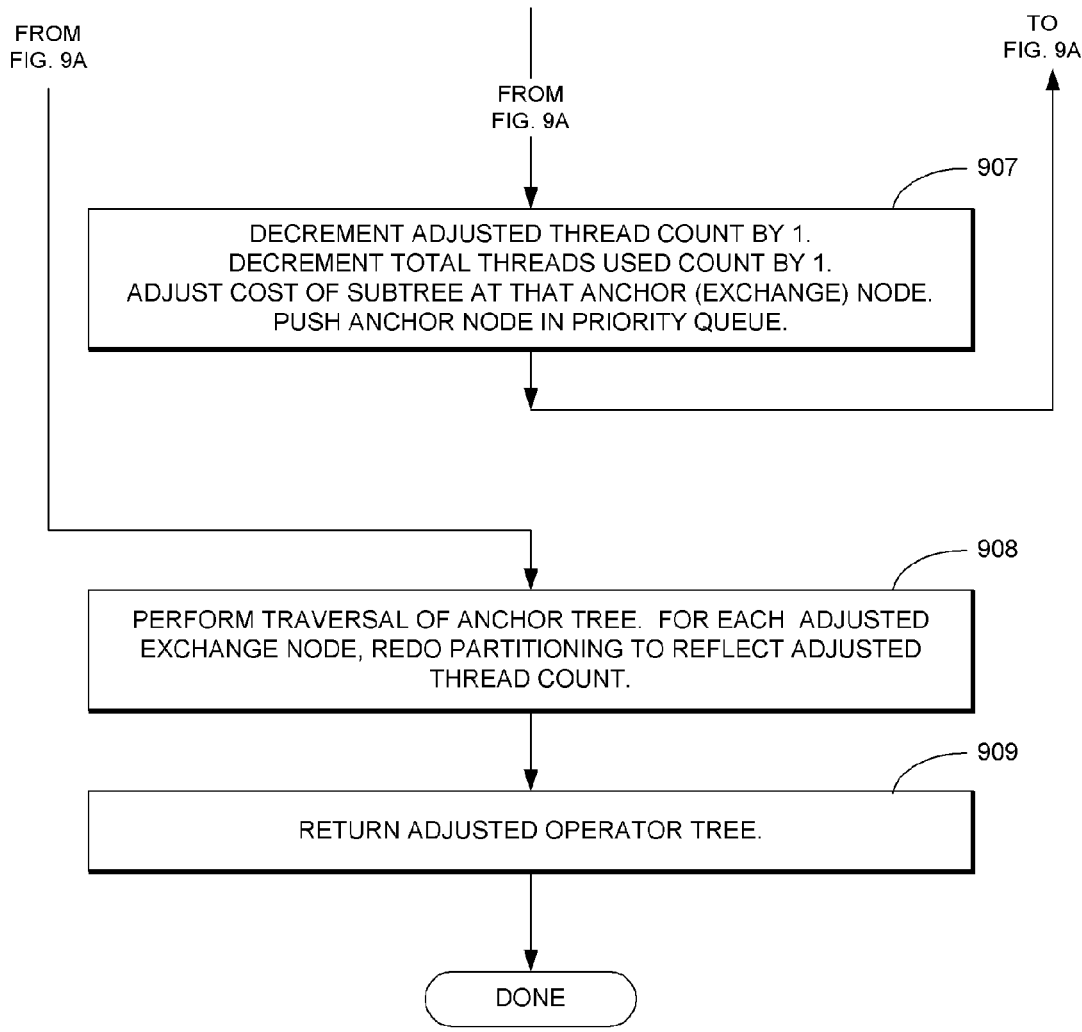

FIGS. 9A-B comprise a single flowchart 900 illustrating the method steps of the compile time adjustment process of the present invention. As shown, the compile time adjustment process commences at step 901 with an operator tree and available threads as input. At step 902, a post-order tree traversal is performed to create an anchor tree. Each time an Xchg node is hit during the traversal, it is packaged into a separate tree node which is referred to as the "anchor tree node" (or "anchor node") and put into the "anchor" tree. Each anchor node has the following information: (1) whether the Xchg is adjustable; and (2) an initialization of adjusted thread count=original thread count. The variable "adjusted thread count" is the one decremented every time this Xchg comes up for adjustment to the number of threads used.

At step 903, the anchor tree is traversed and each anchor node is inserted into a priority queue sorted based on the cost of the subtree rooted at that anchor node. The node having the lowest cost percolates up to the head of the priority queue. The total threads used are also calculated. At step 904, a determination is made as to whether all available threads have been used. If the total threads used are less than or equal to the available threads the process proceeds to step 908. Otherwise, the process proceeds to step 905 (i.e., if the total threads used are greater than the available treads).

At step 905, the anchor node at the head of the priority queue is removed. At step 906 a determination is made as to whether the anchor node (i.e., the anchored Xchg node) can be adjusted. If the anchor node cannot be adjusted, the anchor node is popped from the priority queue and steps 905 and 906 are repeated. Otherwise, if the anchor node can be adjusted, the process proceeds to step 907.

At step 907, the following operations occur: the adjusted thread count is decremented by one; the total threads used count is decremented by one, the cost of the subtree at the anchor node (anchored Xchg node) is adjusted; and the anchor node is pushed in the priority queue. The process then returns to step 904 for determining whether the total threads used are less than or equal to the available threads. When the total threads used is less than or equal to the available threads, the method proceeds to step 908. At step 908, the anchor tree is traversed. For each exchange node that has been adjusted, the partitioning is redone to reflect the adjusted thread count. As mentioned before, changing the thread count means changing the partitioning as the property of the data stream changes. The adjusted operator tree is then returned at step 909.

Schedule Generation

Before describing the present invention's schedule generation process in greater detail, the identification of pipelines inside a query tree and what this means to parallelism will first be briefly described. The component-expansion of an operator tree is created from the basic physical operator tree. As mentioned earlier, the component expansion separates the NPS resource intensive operations from those that are not NPS resource intensive. This is represented by creating additional operators and distributing the cost vector to the new operators accordingly. In addition, this module identifies the edges that show pipelined and precedence constraints. This can be illustrated by example.

Figure 10A:
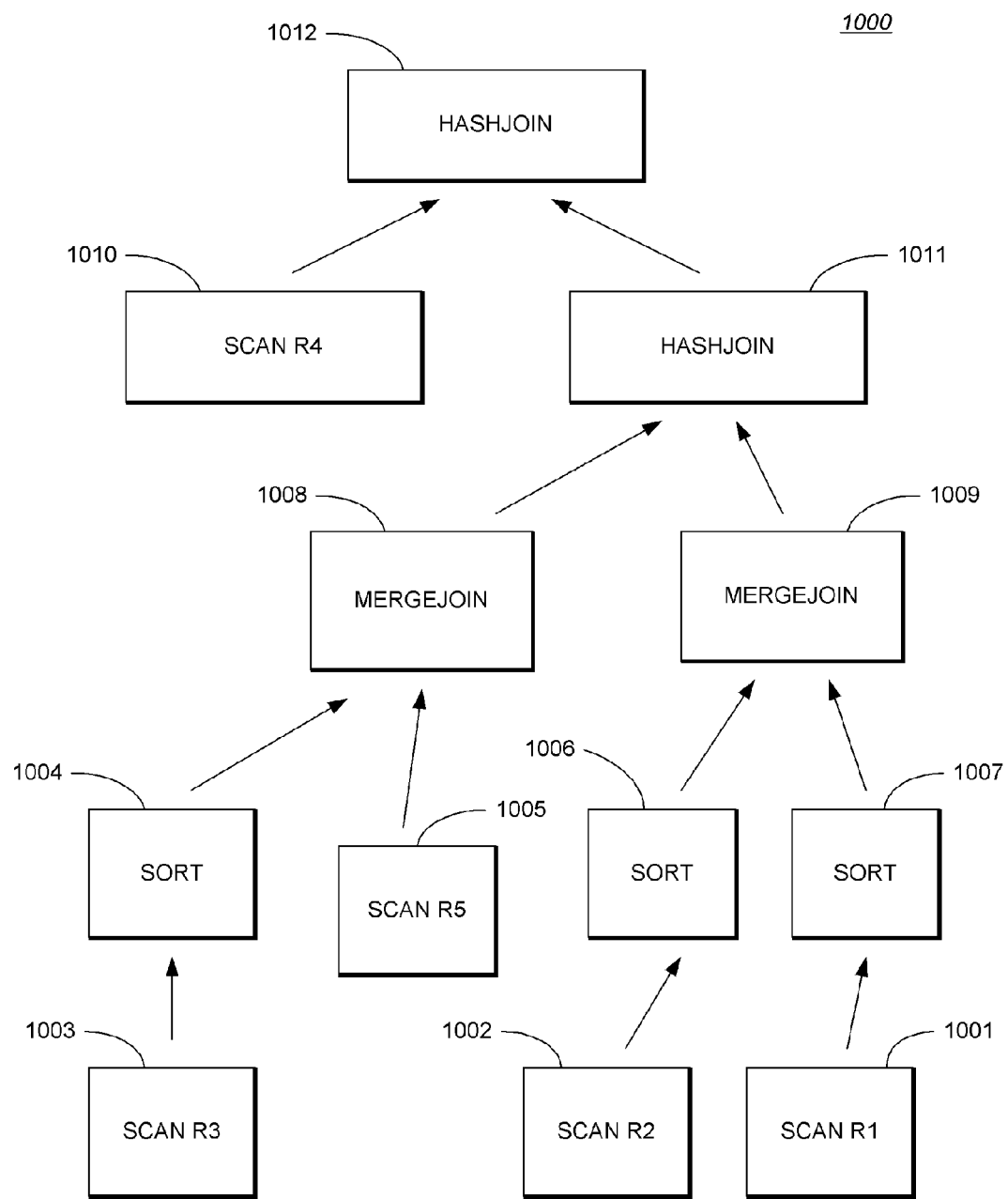
FIG. 10A is a block diagram illustrating an example bushy operator tree.
Figure 10B:
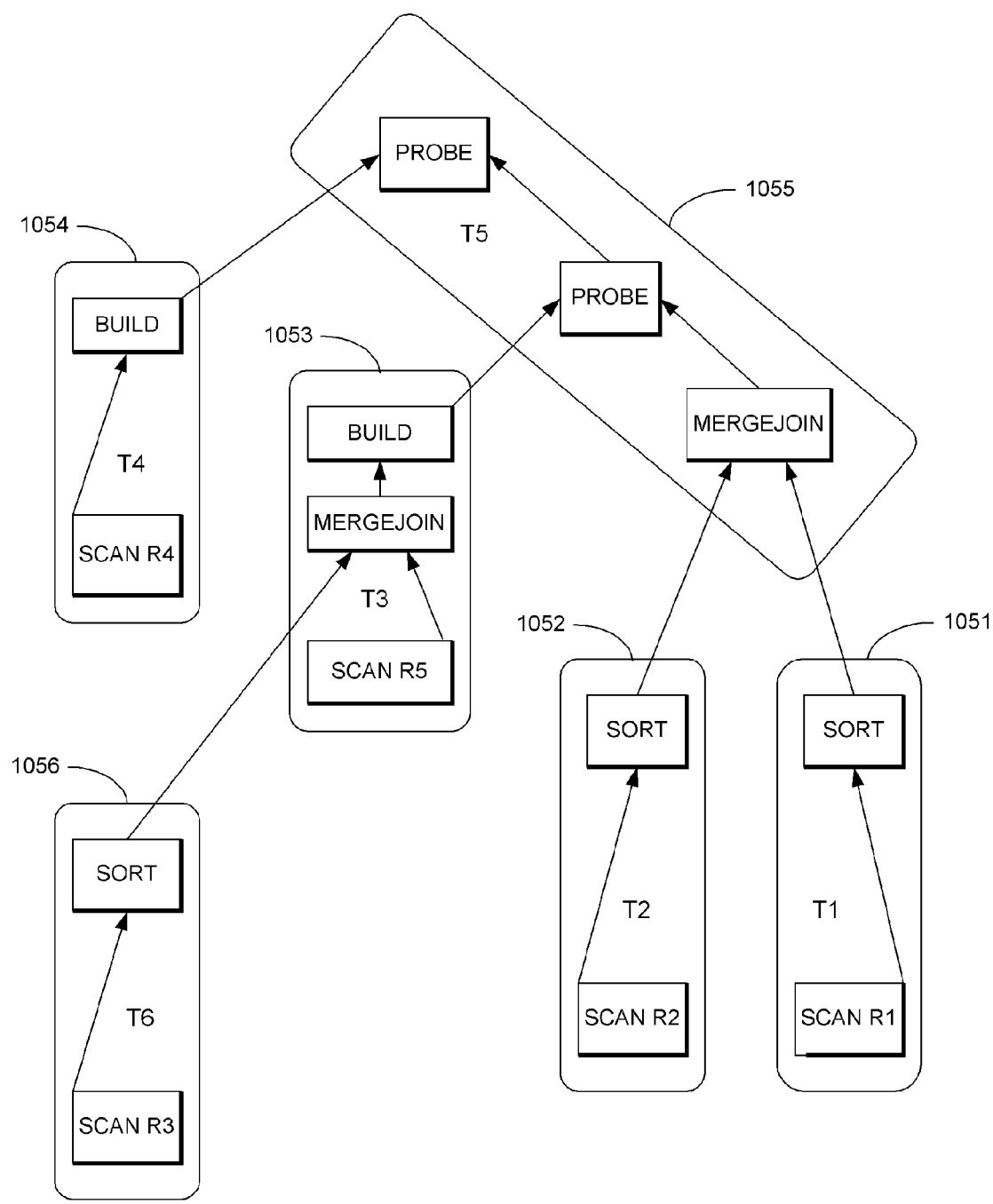
FIG. 10B is a block diagram showing the component macro-expansion of the operator tree depicted in FIG. 10A.

FIG. 10A is a block diagram illustrating an example bushy operator tree 1000. As shown, the operator tree 1000 includes scan nodes 1001, 1002, 1003, 1005, 1010 and sort nodes 1004, 1006, 1007. It also includes mergejoin (merge join) nodes 1008, 1009, and hashjoin (hash join) nodes 1011, 1012. FIG. 10B is a block diagram showing the component-expansion of the operator tree depicted in FIG. 10A. The component-expansion is undertaken to isolate the pipelined edges. This knowledge comes from the fact that the behavior of certain operators causes blocking operations (e.g., SORT, BUILD, or the like).

Figure 11:
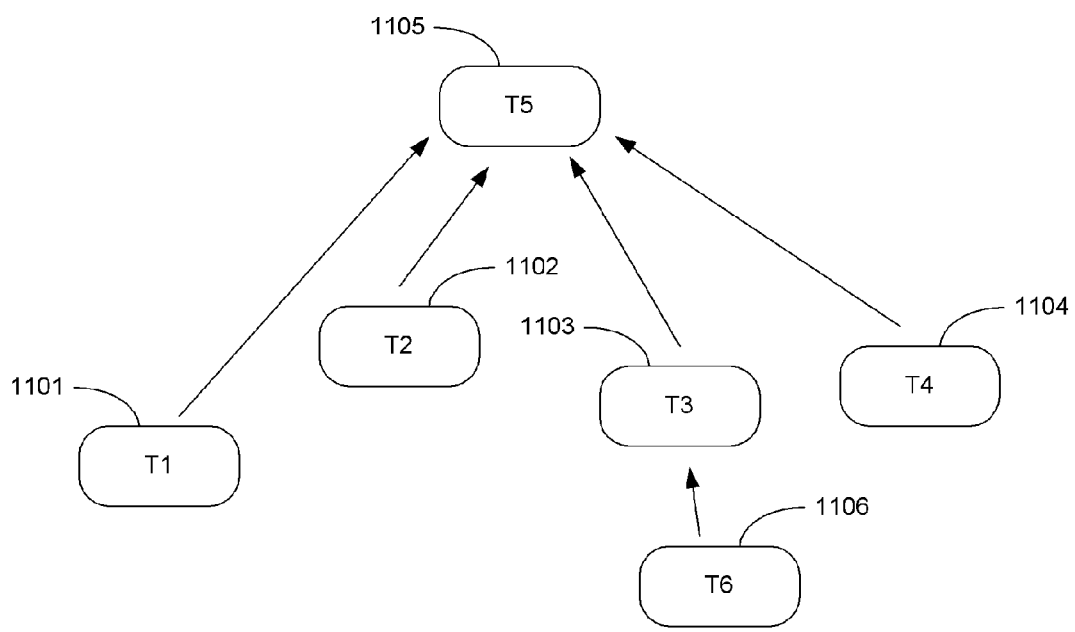
FIG. 11 is a block diagram illustrating an event tree corresponding to FIGS. 10A-B.

In FIG. 10B six pipelines T1-T6 (referred to as 1051-1056, respectively) are identified, and each of these pipelines shares certain dependencies in its execution sequence. For example, pipelines T1, T2, T4, T6, (1051, 1052, 1054, 1056) can be executed in parallel. However, T3 (1053) can start only after T6 (1056) is done. T5 (1055) cannot start until all of the pipelines T1-T4 have been completed. The execution instances of pipelines are called "events", and hence a tree of pipelines with a dependency is called an "event tree". FIG. 11 is a block diagram illustrating an event tree 1100 corresponding to FIGS. 10A, 10B. The event tree 1100 depicted at FIG. 11 illustrates the pipelines' dependencies.

The Xchg operator includes a producer part and a consumer part. Its resource vector is split in order to add its component cost to the producer and consumer pipelines. The scheduler looks at the pipes (pipelines) and based upon the available set of resources, decides the specific order in which to execute them. When too many pipes are active at the same time, the resource usage of the system is too high and the system may eventually run out of resources, which stalls the pipes. The methodology of the present invention provides for starting an optimal set of pipes in a sequential fashion without overloading the resource requirement. The scheduler determines what pipelines need to be invoked and in what order. The ordering is also termed "shelves".

Figure 12A:
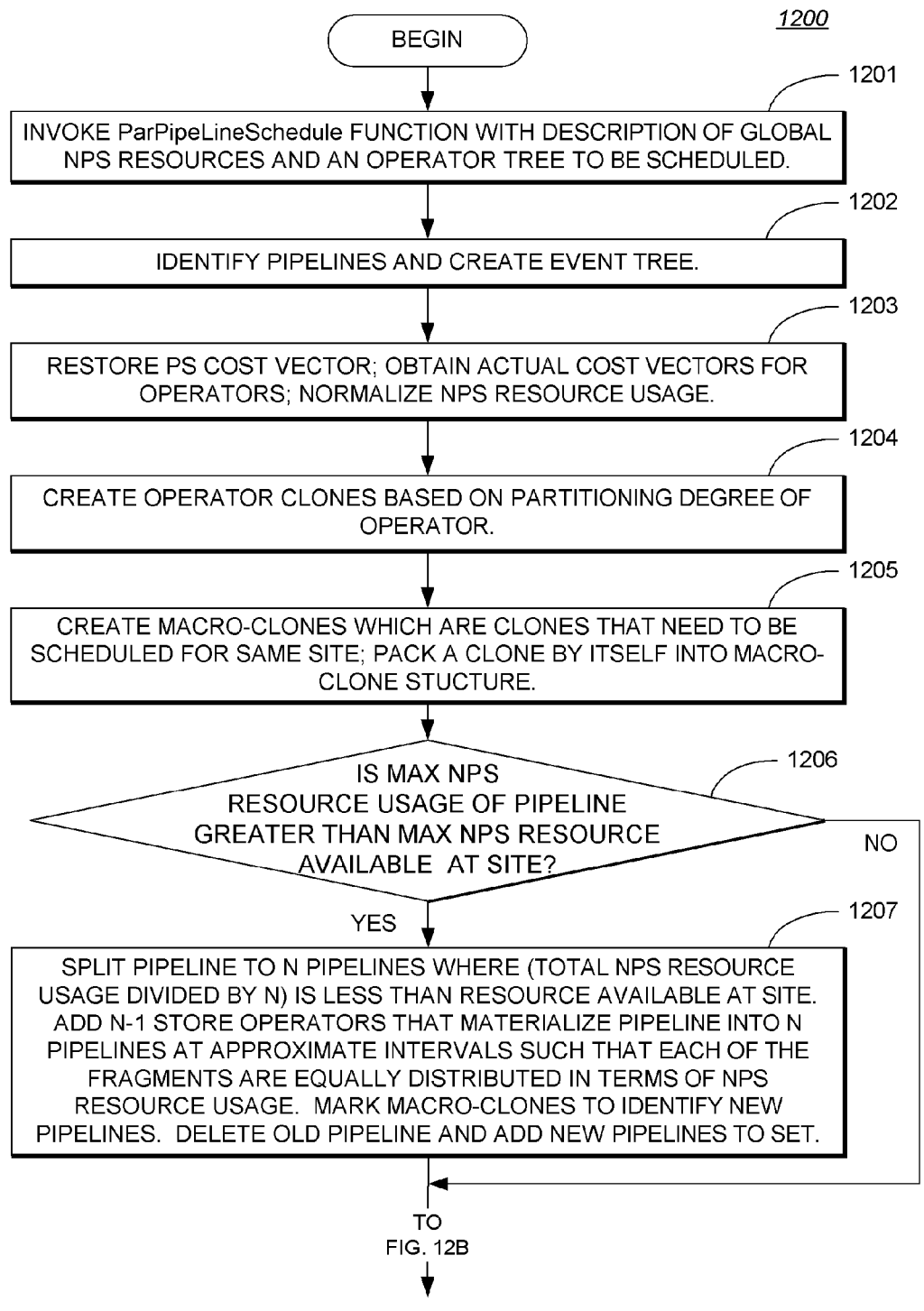
FIGS. 12A-B comprise a single flowchart illustrating the method steps of the present invention for scheduling of pipelines.
Figure 12B:
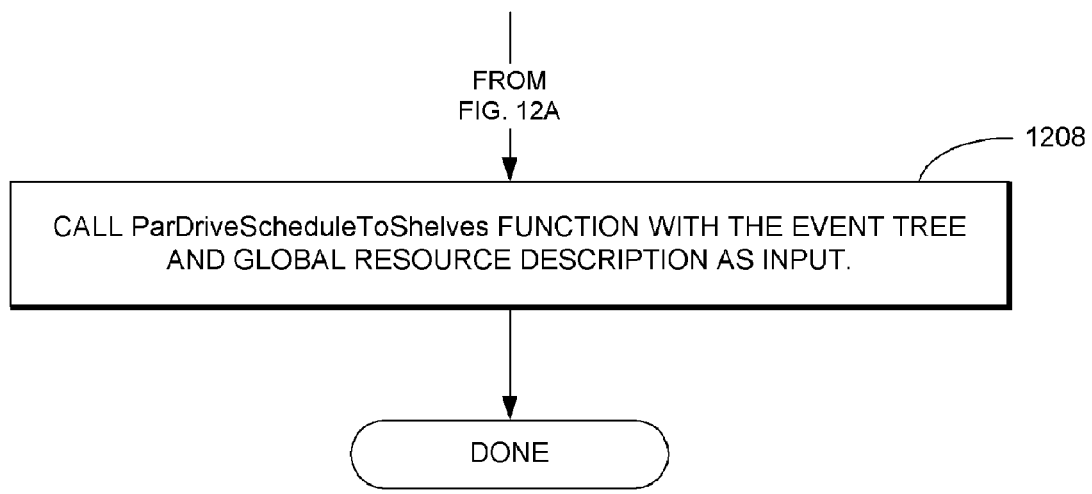

FIGS. 12A-B comprise a single flowchart 1200 illustrating the method steps of the present invention for scheduling of pipelines. Once an event tree has been created and the dependent pipelines captured in the event tree, the scheduling algorithm is invoked. As shown at 1201, a ParPipeLineSchedule function is invoked with a description of Global NPS (non-preemptable) resources and an operator tree to be scheduled. This function takes all of the pipelines and segregates them into "shelves" of pipelines. Each shelf contains a set of pipelines that can be run. Once all the pipelines in a given shelf have been run, the pipelines in the next shelf are ready to be run. The process of dividing the event tree into shelves of pipelines is referred to as scheduling.

At step 1202, the pipelines are identified and an event tree is created. At step 1203, the PS cost vector is restored, the actual cost vectors for operators are obtained, and the NPS resource usage is normalized. The preemptable resource (PS) cost is a cumulative cost of an operator tree rooted at itself. Since standalone cost of the operators is needed, the PS cost is restored by subtracting the PS cost of its child sub-tree from itself. NPS resources on the other hand are represented by the number of pages used by an operator. This is normalized by dividing the number of pages used by the operator to that of the maximum number of pages available at a site.

Operator clones are next created at step 1204 based on the partitioning degree of the operator. Partitioning of an operator is decided in the core optimizer. If an operator has a range partitioning of N, only the number N is of interest as this provides the number of clones created on behalf of the operator. However, some clones of adjacent operators need to be on the same site so as to prevent any data movement (as in the case of a join and a grouping node next to each other with exactly the same partitioning). At step 1205, clones of such operators are clubbed together to create a macro-clone, which is a clone that needs to be scheduled for the same site. A clone by itself is also packed into the same macro-clone structure. This essentially reduces the scheduling problem to one of scheduling of macro-clones.

After the creation of macro-clones, a determination is made as to whether the maximum NPS resource usage of a pipeline has exceeded that maximum (max) NPS resource available at a site at step 1206. If not, the method proceeds to step 1208. However, if the max NPS resource usage of the pipeline is greater than the max NPS resource available at a site, the process proceeds to step 1207.

At step 1207, the pipeline is split into N pipelines where (total NPS resource usage/N) is less than resource available at the site. N−1 store operators that materialize the pipeline into N pipelines are added at approximate intervals such that each of the fragments are equally distributed in terms of NPS resource usage. Macro-clones are then marked to identify new pipelines. The old pipeline is deleted and the new pipelines are added to the set.

At step 1208, a ParDriveScheduleToShelves function is called. The input to this function is an event tree. The event tree captures pipelines and the pipelines have a way of accessing all of their macro-clones. The global resource is also used as a parameter by this ParDriveScheduleToShelves function in an indirect fashion. The ParDriveScheduleToShelves function is described below and at FIG. 13A.

Figure 13A:
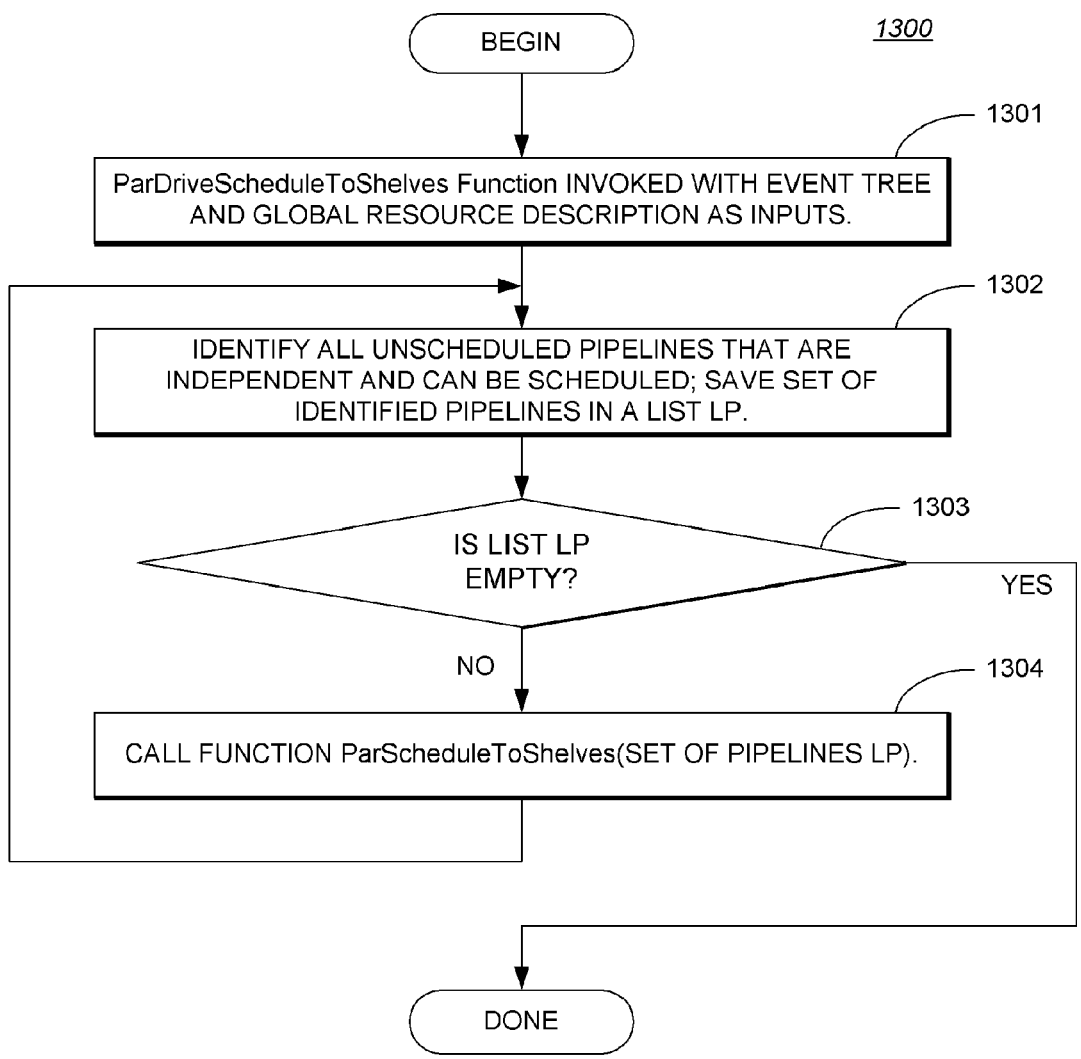
FIG. 13A is a flowchart illustrating the ParDriveSchedule-ToShelves function of the present invention.

FIG. 13A is a flowchart 1300 illustrating the ParDriveScheduleToShelves function of the present invention. As shown at 1301, inputs to this function include an event tree and a global resource description.

At step 1302, all unscheduled pipelines that are independent and can be scheduled are identified. This set of identified pipelines is saved in a list LP. At step 1303, a check is made to determine whether or not the list LP is empty. If LP is empty, the function is complete. Otherwise, if LP is not empty, a ParScheduleToShelves function is called at step 1304. The primary objective of the ParScheduleToShelves function is to schedule the set of pipelines in the list LP. The ParScheduleToShelves function is described below and in FIG. 13B. Steps 1302-1304 may be repeated until LP is empty.

Figure 13B:
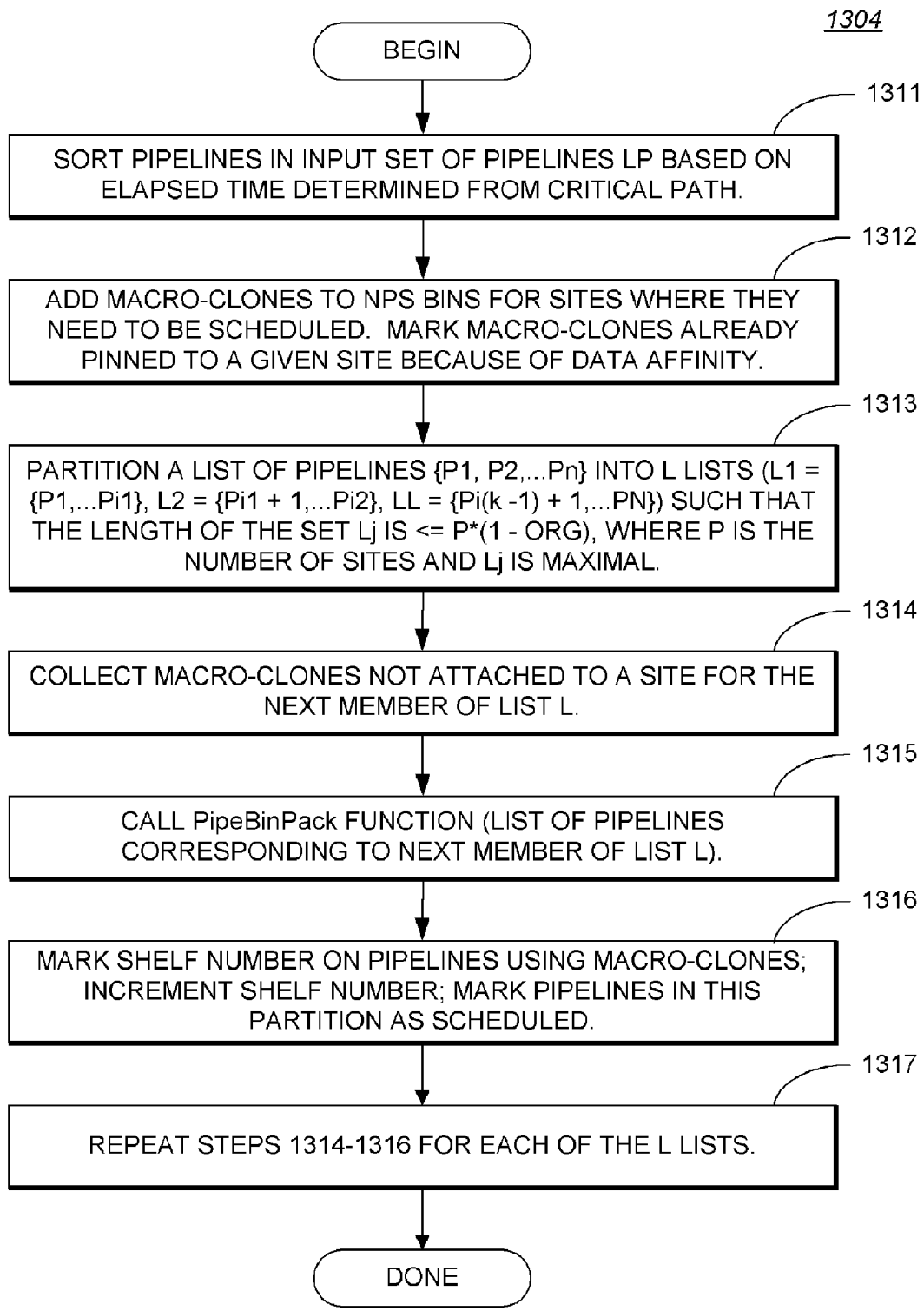
FIG. 13B is a flowchart corresponding to step 1304 of FIG. 13A illustrating the ParScheduleToShelves function of the present invention.

FIG. 13B is a flowchart 1304 corresponding to step 1304 of FIG. 13A illustrating the ParScheduleToShelves function of the present invention. As described above, a set (list) of pipelines LP to be scheduled is input to the ParScheduleToShelves function.

At step 1311, the input set of pipelines LP is sorted based on the elapsed time of each of the pipelines determined from the critical path. At step 1312, macro-clones are added to NPS bins for sites where they need to be scheduled. Those macro-clones that are already pinned to a given site because of data affinity will be marked pinned.

At step 1313, the list of pipelines (P1, P2, . . . Pn) is partitioned into L such lists (L1={P1, . . . Pi1}, L2={Pi1+1, . . . Pi2}, LL={Pi(k−1)+1, . . . Pn}) such that the length of the set Lj is less than or equal to P*(1−ORG) where P is the number of sites and Lj is maximal. This partitioning provides that the total NPS resource required for each partition will not exceed P*(1−ORG), where P is the number of sites and ORG is the operator's resource granularity. This gives a sufficiency condition for a partition of pipelines to be scheduled.

At step 1314, those macro-clones that are not attached to a site are now collected for the next member of list L. At step 1315, a PipeBinPack function is called with a list of pipelines corresponding to the next member of list L. The PipeBinPack function performs the actual bin-packing for pinning macro-clones to a given site. The PipeBinPack function is described below and in FIG. 14.

At step 1316, the pipelines are marked with the current shelf number using macro-clones, and the shelf number is incremented. All of the pipelines in this partition will be put in this shelf and hence are marked as scheduled. At step 1317, the above steps 1314-1316 are repeated for each partition (i.e., each list L) of the original list of pipelines that was received. The function is complete when each of the L partitions has been processed.

Figure 14:
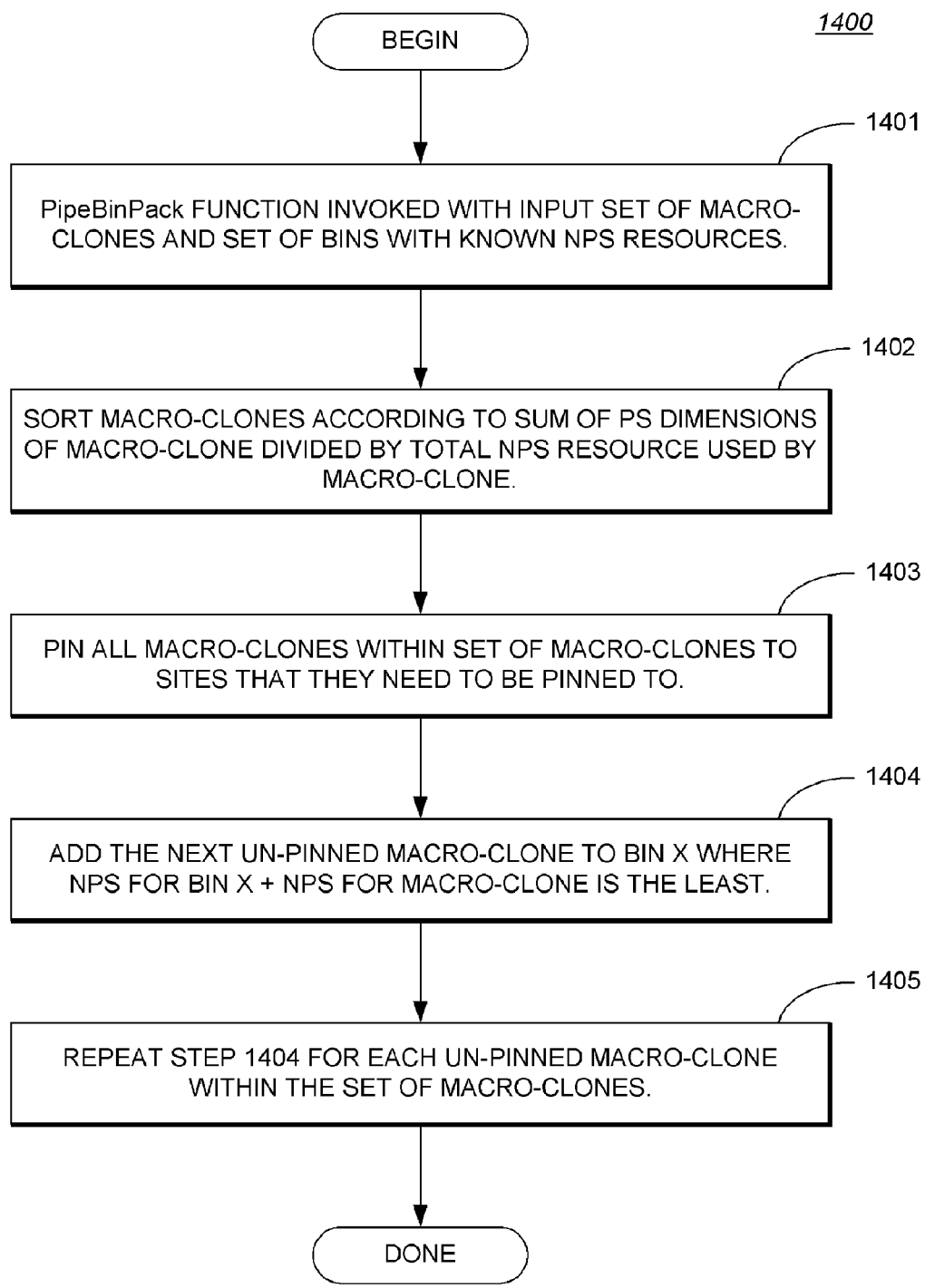
FIG. 14 is a flowchart illustrating the methodology of the present invention for bin-packing of macro-clones.

FIG. 14 is a flowchart 1400 illustrating the methodology of the present invention for bin-packing of macro-clones. At step 1401, the PipeBinPack function receives a set of macro-clones and a set of bins with known NPS resources as input. At step 1402, the macro-clones are sorted according to the sum of the PS dimensions of the macro-clone divided by the total NPS resource used by the macro-clone. After sorting, all macro-clones within the set of macro-clones, that are already pinned to a given site need to be added to their respective bins as outlined in step 1403. At step 1404, the next un-pinned macro-clone is added to bin X where NPS for bin X+NPS for macro-clone is the least. At step 1405, step 1404 is repeated for each un-pinned macro-clone within the set of macro-clones.

The following is a sample schedule for the event tree illustrated in FIG. 11:

```
Pipelines:
    Pipeline T4: START
        Hash Join(Build)
            Scan R4
    Pipeline T1: END
    Pipeline T3: START
        Hash Join(Build)
            MergeJoin
                PipeLine T6
                    Scan R5
    Pipeline T3: END
    Pipeline T2: START
        Sort
            Scan R2
    Pipeline T2: END
    PipeLine T6: START
        Sort
            Scan R3
    PipeLine T6: END
    Pipeline T1: START
        Sort
            Scan R1
    Pipeline T1: END
    Pipeline T5: START
        Hash Join(Probe)
            Pipeline T4
            Hash Join(Probe)
                Pipeline T3
                Merge
                    Pipeline T2
                    Pipeline T1
    Pipeline T5: END
Printing Event Trees
    Pipeline T5
        Pipeline T1
        Pipeline T2
        Pipeline T3
            Pipeline T6
        Pipeline T4
Printing Final Schedule
    Shelf: 1
        Pipeline T1
        Pipeline T6
    Shelf: 2
        Pipeline T2
        Pipeline T3
            Pipeline T4
    Shelf: 3
        Pipeline T5
```

As can be seen in the above example, pipelines T1 and T6 are executed first, followed by T2, T3, and T4. Finally, T5 is executed and consumes the data from each of the pipelines. The schedule is then used to perform some transformation that includes: adding Xchg nodes at the top of pipelines if there are none, such that these can be scheduled individually; and compiling the schedule into the query execution plan.

Clones and Macro-Clones

The following discussion will describe certain data structures and methods of the currently preferred embodiment of the present invention in greater detail. The following OpClone class represents a clone of an operator:

```
1: class OpClone
2: {
3: public:
4:    /**
5:     * Ctor
6:     *
7:     * @param phdr - ptr to the OptPool
8:     * @param node - the pop whose clone is being created
9:     * @param numtsdim - max arity of PS resource
10:    * @param numssdim - max arity of NPS resource
11:    */
12:    SYB_INLINE
13:    OpClone(
14:      OptPool   *phdr,
15:      Ppop      *node,
16:      int32     numtsdim,
17:      int32     numssdim);
18:
19:    /**
20:     * Overloaded operators are used to sort the clones
21:     * based on their ids
22:     */
23:    SYB_INLINE bool operator<( const OpClone& second) const;
24:
25:    /**
26:     * CloneGetNpsResource
27:     *   Get the NpS resource for this clone
28:     * @return the Nps resource
29:     */
30:    SYB_INLINE NpsResource *
31:    CloneGetTsResource(void) const;
32:
33:    /**
34:     * CloneGetPsResource
35:     *   Get the PS resource for this clone
36:     * @return the PS resource
37:     */
38:    SYB_INLINE NpsResource *
39:    CloneGetNpsResource(void) const;
40:
41:    /**
42:     * CloneSetSiteId
43:     * Set the site id to where the clone will be
44:     * executing
45:     * @param siteid - the site id for the clone
46:     */
47:    SYB_INLINE void
48:    CloneSetSiteId(SiteIdType siteid);
49:
50:    /**
51:     * CloneGetSiteId
52:     *   Get the site id for this clone
53:     * @return the site id for the clone
54:     */
55:    SYB_INLINE SiteIdType
56:    CloneGetSiteId(void) const;
57:
58:    /**
59:     * CloneGetPop
60:     *   Get the pop to which this clone belong to
61:     * @return the pop
62:     */
63:    SYB_INLINE Ppop *
64:    CloneGetPop(void) const;
65: private:
66:    /*
67:     * The Pop node that its is cloned from
68:     */
69:    Ppop       *_cloneOfPop;
70:    /*
71:     * NPS resource for the clone
72:     */
73:    NpsResource *_npsUsage;
74:    /*
75:     * PS resource for the clone
76:     */
```

```
77:    PsResource *_psUsage;
78:    /*
79:     * Id of the clone, based on the sequence of partitions
80:     */
81:    CloneIdType _cloneId;
82:    /*
83:     * the site id where this clone needs to be run
84:     */
85:    SiteIdType _siteId;
86: };
```

The clone of an operator as represented in the above OpClone class is the smallest schedulable/runnable unit in a parallel query plan.

The concept of a macro-clone is used to reflect that clones are really not "floating". Rather clones float only to an extent such that clones that participate in a legal relational operation need to be local on a given site to minimize data movement. For example, if two clones from two different operators are not broken by an exchange (Xchg), then there must be some benefit in running them at the same site. Consider the following physical tree:

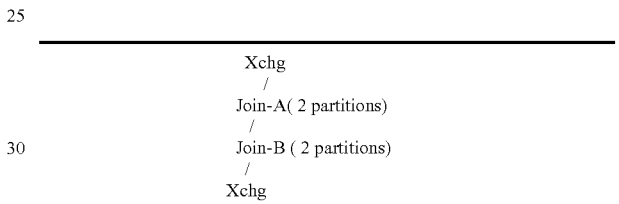

As shown, the above tree includes two join operations (Join-A and Join-B), not broken by an exchange (Xchg). In this case it may be advisable to keep the corresponding clones of the two joins on one site. Otherwise, it may be necessary to do a data movement which had not been accounted for by the core optimizer. The following MacroClone class illustrates the concept of macro-clones:

```
1: class MacroClone
2: {
3: public:
4:    SYB_INLINE
5:    MacroClone(void);
6:
7:    /**
8:     * Ctor
9:     *
10:    * @param phdr - ptr to memory pool
11:    * @param clone - ptr to a clone
12:    */
13:
14:    SYB_INLINE
15:    MacroClone(
16:      OptPool   *phdr,
17:      OpClone   *clone);
18:
19:    SYB_INLINE const OpCloneListType &
20:    McGetCloneSet(void) const;
21:
22:    /**
23:     * standard comparison operator less than is overloaded
24:     * because we have a need to sort the macroclones
25:     *
26:     * @return TRUE if less, FALSE, otherwise
27:     */
28:    SYB_INLINE bool operator<( const MacroClone& second) const;
29:
```

```
 30:    /**
 31:     * McComputeNpsResource
 32:     *   This computes the NPS resource for a macro-clone
 33:     */
 34:    SYB_INLINE void
 35:    McComputeNpsResource( );
 36:
 37:    /**
 38:     * McComputePsResource
 39:     *   This computes the PS resource for a macro-clone
 40:     */
 41:    SYB_INLINE void
 42:    McComputePsResource( );
 43:
 44:    /**
 45:     * McGetPsResource
 46:     *   A macro clone can be asked for Ps resource, which would
 47:     * be a union of all its clones' Ps resources. This information
 48:     * is usually cached.
 49:     *
 50:     * @return the PsResource that is a summation of PsResource
 51:     * for all clones
 52:     */
 53:    SYB_INLINE PsResource *
 54:    McGetPsResource( ) const;
 55:
 56:    /**
 57:     * McGetNpsResource
 58:     *   A macro clone can be asked for Nps resource, which would
 59:     * be a union of all its clones' Nps resources. This information
 60:     * is usually cached.
 61:     *
 62:     * @return the NpsResource that is a summation of NpsResource
 63:     *   for all clones
 64:     */
 65:    SYB_INLINE NpsResource *
 66:    McGetNpsResource( ) const;
 67:
 68:    /**
 69:     * McSatisfied
 70:     *   Check if the "avail" (available) resource is
 71:     * sufficient enough for this macro clone to fit in. This is
 72:     * achieved by adding up the current macroclone's resource to
 73:     * "used" and then seeing if we've exceeded the capacity.
 74:     * It is interesting that we use "avail" and not 1.0 as the max
 75:     * capacity, since it takes care of heterogeneous cluster
 76:     * (heterogeneous in terms of non-preemptable resources)
 77:     *
 78:     * @param avail - available non-preemptable resource
 79:     * @param used - non-preemptable resource that has been used
 80:     */
 81:    SYB_INLINE SYB_BOOLEAN
 82:    McSatisfied(
 83:     NpsResource  *avail,
 84:     NpsResource  *used);
 85:
 86:    /**
 87:     * McAddOpClone
 88:     *   Add a new operator clone to this macro clone
 89:     *
 90:     * @param clone - a new operator clone to add
 91:     */
 92:    SYB_INLINE void
 93:    McAddOpClone(OpClone *clone);
 94:
 95:    /**
 96:     * McGetCloneCount
 97:     *   Get the number of clones in a macro-clone
 98:     *
 99:     * @return the number of clones
100:     */
101:    SYB_INLINE int32
102:    McGetCloneCount(void) const;
103:
104:    /**
105:     * McSetSiteId
106:     *   Set site id information for each clone
107:     *
108:     * @param siteid - the site id
109:     */
110:    SYB_INLINE void
111:    McSetSiteId(SiteIdType siteid);
112:
113:    /**
114:     * McGetSiteId
115:     *   Get site id info for the clones; they should share the
116:     * same site id by definition of a macroclone
117:     *
118:     * @return the site id of this macro-clone
119:     */
120:    SYB_INLINE SiteIdType
121:    McGetSiteId(void) const;
122:
123:    /**
124:     * McIsPinnedToSite
125:     *   Check if a macro clone is pinned to a site or not ?
126:     *
127:     * @return TRUE if macro clone pinned to a site, FALSE,
128:     *   otherwise
129:     */
130:    SYB_INLINE SYB_BOOLEAN
131:    McIsPinnedToSite(void) const;
132:
133: private:
134:    /*
135:     * the set of clones in this macro-clone
136:     */
137:    OpCloneListType   _cloneset;
138:
139:    /*
140:     * Collective resource usage is tracked for all
141:     * the clones
142:     */
143:    PsResource       *_psResForMac;
144:    NpsResource      *_npsResForMac;
145:
146:    /*
147:     * state information
148:     */
149:    uint32       _state;
150:
151:    static const uint32   MC_NPSRES_UPDATED;
152:    static const uint32   MC_PSRES_UPDATED;
153: };
```

As shown above, a McSatisfied method can be called to check whether the available (avail) resource is sufficient for a macro-clone to fit in. This is done by adding up the current macro-clone's resource usage (used) and then determining if capacity is exceeded. It should be noted that available resource is used as the maximum capacity, since it takes care of heterogeneous cluster (heterogeneous in terms of space shared resources).

Pipelines

A classical definition of a pipeline says that it is a given logical entity where all the participating operations start between (t, t+delta) and end between (t1, t1+delta). The following PipeLine class is used in the currently preferred embodiment of the present invention to capture the concept of a pipeline:

```
 1: class PipeLine
 2: {
 3: public:
 4:    /**
 5:     * Ctor
 6:     *
 7:     * @param top - is the pop that roots the pipeline
 8:     */
 9:    SYB_INLINE
10:    PipeLine(
```

```
-continued
11:    Ppop      *top);
12:
13:  /**
14:   * getTop
15:   *   Get the top pop of the pipeline
16:   * @return the top pop
17:   */
18:  SYB_INLINE Ppop *
19:  getTop(void) const;
20:
21:  /**
22:   * setTop
23:   *   Set the top of the pipeline to the pop passed
24:   * in as parameter
25:   *
26:   * @param topNode - the pop passed in as parameter
27:   */
28:  SYB_INLINE void
29:  setTop(Ppop    *topnode);
30:
31:  /**
32:   * PipeGetMacroSet
33:   *   Get the macro clone list in this pipe
34:   * @return a reference ptr to the macro clone list
35:   */
36:  SYB_INLINE MacroCloneListType&
37:  PipeGetMacroSet(void);
38:
39:  /**
40:   * Standard less than operator that compares based on
41:   * max time to execute a pipeline
42:   */
43:  SYB_INLINE bool
44:  operator<(const PipeLine& other) const;
45:
46:  /**
47:   * PipePsMax
48:   *   Maximum sequential time taken by a pipeline to
49:   * complete. This method measures that time and returns
50:   * it to the caller
51:   *
52:   * @return the sequential execution time
53:   */
54:  SYB_INLINE double
55:  PipePsMax(void) const;
56:
57:  /**
58:   * PipeGetNpsResourceUsage
59:   *   Gets the total amount of Nps resource used by
60:   * this pipe.
61:   *
62:   * @param ssr - ptr to the NPS resource object that will
63:   *   contain the total NPS resource usage
64:   */
65:  SYB_INLINE void
66:  PipeGetNpsResourceUsage(NpsResource *ssr) const;
67:
68:  /**
69:   * getEventTreeNode
70:   *   Every pipe has a hosting node, which is a tree
71:   * node in a given event tree
72:   *
73:   * @return the event tree node that holds this pipe
74:   */
75:  SYB_INLINE EventTreeNode *
76:  getEventNode(void) const;
77:
78:  /**
79:   * setEventNode
80:   *   Setup the hosting event tree node for this pipeline
81:   *
82:   * @param ttnode - event tree node
83:   */
84:  SYB_INLINE void
85:  setEventNode(EventTreeNode *ttnode);
86:
87:  /**
88:   * PipeSetSchedId
89:   *   Set the schedulable level of the pipe
90:   *
91:   * @param sched_level - set the schedulable level
92:   */
93:  SYB_INLINE void
94:  PipeSetSchedId(uint32 sched_level);
95:
96:  /**
97:   * PipeGetSchedId
98:   *   Get the schedulable level of the pipe
99:   * @return the schedulable level of the pipe
100:  */
101: SYB_INLINE uint32
102: PipeGetSchedId(void);
103:
104: /**
105:  * PipeGetCloneId
106:  *   Get the starting id of the clones
107:  * @return the id of the clones
108:  */
109: SYB_INLINE CloneIdType
110: PipeGetCloneId(void) const;
111:
112: /**
113:  * PipeSetCloneId
114:  *   Set the current clone id that's available for
115:  * next use
116:  *
117:  * @param startid - the start id to assign to clones in
118:  * this pipe
119:  */
120: SYB_INLINE void
121: PipeSetCloneId(CloneIdType startid);
122:
123: /**
124:  * PipeCreateClones
125:  *   Create all the requisite clones for a given pipe
126:  *
127:  * @param phdr - ptr to the memory pool
128:  */
129: void
130: PipeCreateClones(OptPool *pool);
131:
132: /**
133:  * PipeCreateMacroClones
134:  *   Once the basic clones are created, this method
135:  * creates a macro clone by using the data placement constraints
136:  *
137:  * @param pool - ptr to a memory pool
138:  */
139: void
140: PipeCreateMacroClones(OptPool *pool);
141:
142: /**
143:  * PipeBinPack
144:  * Algorithm to run the bin packing method so as to schedule
145:  * all of the macro-clones in a given pipeline
146:  *
147:  * @param ssg - ptr to the global resource descriptor
148:  * @param phdr - ptr to the memory pool for any memory
149: allocation
150:  */
151: void
152: PipeBinPack(
153:         SsgGlobalResource    *ssg,
154:         OptPool              *phdr);
155:
156: /**
157:  * PipeCollectClones
158:  *   collect all clones of a pipeline into a list
159:  * that is passed as a parameter
160:  *
161:  * @param macList - list of macro clones
162:  */
163: void
164: PipeCollectClones(MacroCloneListType &macList) const;
165:
166: /**
167:  * PipeMacCloneSort
168:  *   sort clones by the ratio of the length of their PS
```

```
169:     * resource cost vector to that of the length of the
170:     * resource cost vector (work density), which is
171:     * really the crux of the bin-packing algorithm
172:     */
173:    void
174:    PipeMacCloneSort(void);
175:
176: private:
177:    /*
178:     * A pop that starts the top of a pipeline
179:     */
180:    Ppop    *_top;
181:
182:    /*
183:     * set of clones for this pipeline
184:     */
185:    OpCloneListType __cloneset;
186:
187:    /*
188:     * set of macro clones for this pipeline that has met the
189:     * scheduling constraints
190:     */
191:    MacroCloneListType __macrocloneset;
192:
193:    /*
194:     * The event tree node hosting this pipeline
195:     */
196:    EventTreeNode *__hostingNode;
197:
198:    /*
199:     * schedulable level for the pipe
200:     */
201:    uint32   __schedlevel;
202:
203:    /*
204:     * this is the currently exercised id for a clone in a pipe
205:     */
206:    CloneIdType __startid;
207:
208:    /*
209:     * id of the pipe
210:     */
211:    PipeIdType __pipeId;
212: };
```

Using the property of a pipeline, all operators that could be put in the pipeline can be included. Hence, only the top most operator in a given tree fragment needs to be identified.

Event Trees

The following EventTreeNode class represents a node in an event tree:

```
1: class EventTreeNode
2: {
3: public:
4:    enum { TASKNODE_ALLOC_SIZE = 4};
5:    friend class EventTree;
6:
7:    /**
8:     * Ctor
9:     *
10:    * @param pipe - pipeline that will be anchored by this
11:    *    event tree node
12:    * @param phdr - ptr to the memory pool
13:    */
14:    SYB_INLINE
15:    EventTreeNode(
16:       PipeLine  *pipe,
17:       OptPool   *phdr);
18:
19:    ~EventTreeNode( ) { }
20:
21:    /**
22:     * TtnGetPipe
23:     *  Get the pipe anchored to this event tree node
24:     * @return pipe anchored to this event tree node
25:     */
26:    SYB_INLINE PipeLine *
27:    TtnGetPipe(void) const;
28:
29:    /**
30:     * TtnGetArity
31:     *  Get the arity of this event tree node
32:     * @return the arity
33:     */
34:    SYB_INLINE int32
35:    TtnGetArity(void) const;
36:
37:    /**
38:     * TtnSetPipeScheduled
39:     *  Set the state of the pipeline to indicate
40:     * that its scheduling has been completed
41:     */
42:    SYB_INLINE void
43:    TtnSetPipeScheduled(void);
44:
45:    /**
46:     * TtnIsPipeScheduled
47:     *  Check if the pipeline for this event tree node
48:     * has been scheduled or not
49:     *
50:     * @return TRUE, if it is, FALSE, otherwise
51:     */
52:    SYB_INLINE SYB_BOOLEAN
53:    TtnIsPipeScheduled(void);
54:
55:    /**
56:     * TtnCreateClones
57:     *  Create clones for all pops that belongs to the
58:     * pipe rooted at this event tree node
59:     *
60:     * @param phdr - ptr to the OptPool
61:     */
62:    void
63:    TtnCreateClones(OptPool *phdr);
64:
65:    /**
66:     * TtnFindUnschedPipes
67:     *  Find and collect all pipes that can be scheduled at a
68:     * given point
69:     *
70:     * @param ssg - ptr to the global resources
71:     * @param pipe_list - a list of pipes obtained from a call to
72:     * this method
73:     */
74:    SYB_BOOLEAN
75:    TtnFindUnschedPipes(
76:       SsgGlobalResource *ssg,
77:       PipeLineListType& pipe_list);
78:
79: private:
80:    /*
81:     * A event node points to its pipeline
82:     */
83:    PipeLine *__pipeline;
84:
85:    /*
86:     * Arity of the event tree node
87:     */
88:    int32    __arity;
89:
90:    /*
91:     * Number of child node space allocated but not used
92:     */
93:    int32    __allocarity;
94:
95:    /*
96:     * The event tree nodes that this event tree node depends on
97:     */
98:    EventTreeNode **__eventnodes;
99:
100:   /*
101:    * state of a event tree node
```

```
102:    */
103:    uint32      __state;
104:    /*
105:    /*
106:     * indicates the pipe has been scheduled completely
107:     */
108:    static const uint32 PIPE__SCHEDULED;
109: };
```

An Event Tree Node is a node in an event tree that roots a single pipeline. An event tree is a tree that is created based upon the interdependence of the pipelines. The following EventTree class illustrates an event tree:

```
 1: class EventTree
 2: {
 3: public:
 4:    /**
 5:     * Ctor
 6:     *
 7:     * @param phdr - ptr to the memory pool
 8:     * @param tnode - ptr to a event tree node that will be
 9:     * the root node of the event tree
10:     */
11:    SYB_INLINE
12:    EventTree(
13:      OptPool    *phdr,
14:      EventTreeNode *tnode   = NULL);
15:
16:    /**
17:     * TtSetRoot
18:     *   Set the root event tree node of a event tree
19:     *
20:     * @param rootnode - root node of a event tree
21:     */
22:    SYB_INLINE void
23:    TtSetRoot(EventTreeNode *rootnode);
24:
25:    /**
26:     * TtGetRoot
27:     *   Get the root event tree node of a event tree
28:     *
29:     * @return the root event tree node
30:     */
31:    SYB_INLINE EventTreeNode *
32:    TtGetRoot(void) const;
33:
34:    /**
35:     * TtCreateClones
36:     *   Create clones of all pops in all pipes in the
37:     * event tree
38:     */
39:    void
40:    TtCreateClones(void);
41:
42: private:
43:    /*
44:     * OptPool to allocate event trees
45:     */
46:    OptPool     *_eventhdr;
47:
48:    /*
49:     * Root node of a event tree
50:     */
51:    EventTreeNode *_rootnode;
52:
53: };
```

Event trees represent dependencies of pipelines. These event trees are N-arry trees comprised of event tree nodes.

Parallel Scheduling

The following ParSchedule class serves to anchor a number of the scheduling methods of the present invention:

```
 1: class ParSchedule
 2: {
 3: public:
 4:    /**
 5:     * Ctor
 6:     *
 7:     * @param p - ptr to the top of the pop tree
 8:     * @param optGbl - ptr to the OptGlobal
 9:     * @param ssg - ptr to the global resources
10:     */
11:    ParSchedule(
12:      Ppop         *p,
13:      OptGlobal    *optGbl,
14:      SsgGlobalResource *ssg);
15:
16:    /**
17:     * ParSetEventTree
18:     *   Set the root event tree node in the schedule
19:     *
20:     * @param tnode - the top event tree node
21:     */
22:    SYB_INLINE void
23:    ParSetEventTree(EventTreeNode *tnode);
24:
25:    /**
26:     * ParGetEventTree
27:     *   Get the root event tree node in the schedule
28:     * @return the root event tree node
29:     */
30:    SYB_INLINE EventTree *
31:    ParGetEventTree(void) const;
32:
33:    /**
34:     * ParGetPhdr
35:     *   Get the memory pool ptr
36:     * @return the memory pool
37:     */
38:    SYB_INLINE OptPool *
39:    ParGetPhdr(void) const;
40:
41:    /**
42:     * ParGetGlobalRes
43:     * Get  the global resource class ptr
44:     * @return the global resource class ptr
45:     */
46:    SYB_INLINE SsgGlobalResource *
47:    ParGetGlobalRes(void) const;
48:
49:    /**
50:     * ParCreateClones
51:     *   The main driver method that creates clones for a given
52:     * event tree and identifies all constraints related to the
53:     * placement of the clones
54:     */
55:    void
56:    ParCreateClones(void);
57:
58:    /**
59:     * ParDriveScheduleToShelves
60:     *   The main level scheduling algorithm that schedules multiple
61:     * pipelines
62:     *
63:     * @param schedLevel - schedulable level, an id that is
64:     *   assigned to pipes to suggest that ones having the
65:     *   same id can all be scheduled together.
66:     */
67:    void
68:    ParDriveScheduleToShelves(uint32 *schedLevel);
69:
70:    /**
71:     * ParPartitionPipeList
72:     *   Partition a list of pipelines {C1,C2,..Cn} into
73:     * L lists such that P1={C1,..Ci1},P2={Ci1+1,..,Ci2}..,
74:     * LL={Ci(k-1) + 1,..Cn} such that the length of the set
75:     * Lj is <= P(1 - ORG), where P is the number of sites
76:     * and that Lj is maximal.
77:     *
78:     * @param setOfPipes - list of all pipes to be partitioned
79:     * and scheduled based on the schedulability rules
```

```
80:      */
81:      void
82:      ParPartitionPipeList(
83:          PipeLineListType    &setOfPipes);
84:
85:      /**
86:       * ParScheduleToShelves
87:       * Partition a list of pipelines {C1,C2,..Cn} into
88:       * k lists. Then schedule one or more pipelines at a time
89:       * in shelves
90:       *
91:       * @param setOfPipes - list of all pipes to be partitioned
92:       *    and scheduled based on the schedulability rules
93:       * @param level - shelf level
94:       */
95:      void
96:      ParScheduleToSheleves(
97:          PipeLineListType&  setOfPipes,
98:          uint32      *level);
99:
100:     /**
101:      * ParCollectClones
102:      *   Clone collection from pipelines that form a
103:      * collective unit for the purpose of scheduling
104:      *
105:      * @param listOfPipes - list of pipes from which clones
106:      *    need to be collected
107:      * @param cloneList - list of macro clones to collect the
108:      *    set
109:      */
110:     void
111:     ParCollectClones(
112:         const PipeLineListType &listOfPipes,
113:         MacroCloneListType   &cloneList)
114: const;
115:
116:     /**
117:      * ParMarkPipeScheduled
118:      * Mark Pipelines scheduled and set its schedulable levels
119:      *
120:      * @param listOfPipes - list of pipes that are getting
121:      *    scheduled
122:      * @param level - level of the shelf
123:      */
124:     void
125:     ParMarkPipeScheduled(
126:         PipeLineListType *listOfPipes,
127:         uint32       level);
128:
129:     /**
130:      * ParRestorePsCost
131:      *   The PS resource cost is cumulative inside the
132:      * search space. The process of restoring cost vector
133:      * is one in which the actual PS costs of each operator
134:      * is calculated
135:      */
136:     void
137:     ParRestorePsCost( );
138:
139:     /**
140:      * ParSortPipes
141:      *   Sort PipeLines in order of their response times;
142:      * the order being non-decreasing in nature
143:      *
144:      * @param listOfPipes - list of pipes to be sorted
145:      */
146:     void
147:     ParSortPipes(PipeLineListType& listOfPipes);
148:
149: private:
150:     /*
151:      * OptPool to allocate memory from
152:      */
153:     OptPool    *_phdr;
154:
155:     /*
156:      * Ptr to the OptGlobal object which is central to optimizer
157:      */
158:     OptGlobal  *_optGbl;
159:
160:     /*
161:      * The parallel pop tree being analysed here
162:      */
163:     Ppop       *_rootnode;
164:
165:     /*
166:      * The event tree that will be generated
167:      */
168:     EventTree  *_eventtree;
169:
170:     /*
171:      * The global resource information pertaining to sites etc.
172:      */
173:     SsgGlobalResource  *_globalnpsres;
174: };
```

Of particular interest, one of the scheduling routines anchored in the ParSchedule class is the following ParSchedule::ParPipeLineSchedule routine:

```
1: ParSchedule::ParPipeLineSchedule(
2:         Ppop              *p,
3:         OptGlobal         *optGbl,
4:         SsgGlobalResource *ssg)
5: {
6:      EventTreeNode *tnode;
7:      OptPool    *phdr = optGbl->GblGetPhdr( );
8:      uint32      sched_level = 1;
9:      TraceOut    &traceout = ::traceout( );
10:
11:     _eventtree = OPT_NEW(phdr, EventTree(phdr));
12:     _rootnode = p;
13:     _phdr = phdr;
14:     _optGbl = optGbl;
15:     _globalnpsres = ssg;
16:
17:     // Build the event tree now
18:     _rootnode->identifyPipes(&tnode, phdr);
19:     ParSetEventTree(tnode);
20:
21:     // The PS resource cost is cumulative inside the
22:     // search space. The process of restoring cost vector
23:     // is one in which the actual PS costs of each operator
24:     // is calculated
25:     ParRestorePsCost( );
26:
27:     // Create operator clones based on partitioning degree of
28:     // operator
29:     ParCreateClones( );
30:
31:     ParCreateMacroClones( );
32:
33:     // Split pipelines so that none exceeds their NPS resource
34:     // limit
35:
36:     ParSplitPipeLines( );
37:
38:     // Generate the schedule
39:     ParDriveScheduleToShelves(&sched_level);
40: }
```

As shown above, three pointers are received as input parameters. A pointer p points to the root node of the operator tree. An optGbl pointer provides access to the global optimization object. An ssg pointer references the object that holds global information about sites and their respective NPS resources. A constructor walks the Pop tree and macro-expands an operator tree. It then identifies pipelines and their dependencies and comes up with an event tree model to capture this information. This event tree is subsequently used to generate the scheduling information.

The following ParCreateClones method is a main driver method for creating clones for a given task tree and identifying all constraints related to the placement of the clones:

```
1: void
2: ParSchedule::ParCreateClones(void)
3: {
4:     _eventtree->TtCreateClones( );
5: }
```

The below PipeCreateMacroClones method creates macro-clones by looking at the id of the clones.

```
1: void
2: PipeLine::PipeCreateMacroClones(OptPool *phdr)
3: {
4:     OpCloneListIterType    ii;
5:     MacroCloneListIterType jj;
6:     OpClone                *temp_clone;
7:     MacroClone             *temp_mac;
8:     SiteIdType             site_id = NON_EXISTENT_SITEID;
9:
10:
11:    PipeCloneSort( );
12:
13:    for (ii = _cloneset.begin( ); ii != _cloneset.end( ); ++ii)
14:    {
15:        temp_clone = *ii;
16:        if (temp_clone->CloneGetSiteId( ) != site_id)
17:        {
18:           // Create a macro clone and add to
19:           // the set of macroclones
20:
21:           temp_mac = OPT_NEW(phdr, MacroClone(
22:                  phdr,
23:                  temp_clone));
24:           _macrocloneset.push_back(temp_mac);
25:           site_id = temp_clone->CloneGetSiteId( );
26:        }
27:        else
28:        {
29:           temp_mac->McAddOpClone(temp_clone);
30:        }
31:    }
32:
33:    // If any of the macro clone has a "rooted" operator, which
34:    // means that a clone of this macroclone has been pinned,
35:    // which in turn makes the macro clone pinned too
36:
37:    for (jj = _macrocloneset.begin( ); jj != _macrocloneset.end( ); ++jj)
38:    {
39:        temp_mac = *jj;
40:        temp_mac->McCheckAndSetSiteId( );
41:        temp_mac->McComputeNpsResource( );
42:        temp_mac->McComputePsResource( );
43:    }
44: }
```

The above process creates an additional constraint on placement of clones at a given site.

The following ParDriveScheduleToShelves routine is a core routine handling scheduling of multiple pipelines in a bushy tree (left deep tree included):

```
1: void
2: ParSchedule::ParDriveScheduleToShelves(
3:     uint32            *schedulelevel)
4: {
5:     PipeLineListType    set_of_pipes;
6:
7:     _eventtree->TtGetRoot( )->TtnFindUnschedPipes(
8:                   _globalssres,
9:                   set_of_pipes);
10:    if (!set_of_pipes.empty( ))
11:    {
12:        ParScheduleToShelves(
13:            set_of_pipes,
14:            schedulelevel);
15:    }
16:    // All pipes have been scheduled
17:    // This is great :-)
18: }
```

An event tree is traversed to identify all possible pipelines that can be scheduled at a given point. A schedulelevel input parameter indicates a schedulable level, an id that is assigned to pipes to suggest that ones having the same id can be scheduled together. Given a set of pipelines $\{C1, \ldots, Cn\}$ that meet the ORG limits and a set of P sites, the above routine calls a classical bin packing routine to stack the pipelines in shelves. The result is a mapping of clones to sites that does not violate its NPS constraints or pipeline dependencies.

The following TtnFindUnschedPipes method goes through an event tree and determines if there are pipelines that become ready to schedule because some dependencies have been satisfied:

```
1: SYB_BOOLEAN
2: EventTreeNode::TtnFindUnschedPipes(
3:             SsgGlobalResource    *ssg,
4:             PipeLineListType     &set_of_pipes);
```

The above function receives as parameters a pointer to the global resource (ssg) and a list of pipelines being examined. The function returns a Boolean. It returns TRUE to indicate that a given node has already been scheduled and FALSE otherwise. Also note that it has the side effect of adding pipes to the set_of_pipes list.

The below ParScheduleToShelves function partitions a list of pipelines:

```
1: void
2: ParSchedule::ParScheduleToShelves(
3:         PipeLineListType   &set_of_pipes,
4:         uint32             *schedlevel)
5: {
6:    PipeLineList2IterType   part_iter;
7:    PipeLineListType    *eachPipeList;
8:    PipeLine            temp_pipe;
9:
10:   while (!set_of_pipes.empty( ))
11:   {
12:       // Sort the pipelines in non-increasing order
13:       // of their Tmax
14:
15:       ParSortPipes(set_of_pipes);
16:       ParPartitionPipeList(set_of_pipes);
17:
18:       // The list has been partitioned and everything looks
19:       // good
20:
21:       for (part_iter = _partitionOfPipes.begin( );
22:            part_iter != _partitionOfPipes.end( );
23:            part_iter++)
24:       {
25:           eachPipeList = *part_iter;
26:           ParCollectFloatingClones(
```

```
27:             *eachPipeList,
28:             temp_pipe.PipeGetMacroSet( ));
29:
30:        // Mark all pipes that will get scheduled
31:        // This is done in advance with the knowledge
32:        // that BinPack will not bomb on us
33:
34:        ParMarkPipeScheduled(eachPipeList,
*schedlevel);
35:        temp_pipe.PipeBinPack(_globalssres, _phdr);
36:
37:        // Everything in tempPipe has been scheduled;
38:        // so start with a clean slate and a new
schedule level
39:
40:        ++(*schedlevel);
41:        temp_pipe.PipeCleanse( );
42:
43:        // All that could not be scheduled will be
44:        // refound. So delete them anyway
45:
46:        set_of_pipes.clear( );
47:
48:        // Find all pipes that become available for
49:        // scheduling
50:
51:        _eventtree->TtGetRoot( )->TtnFindUnschedPipes(
52:             _globalssres,
53:             set_of_pipes);
54:    }
55:  }
56: }
57: }
```

The above routine partitions a list of pipelines {C1, C2, ... Cn} into k lists such that L1={C1, ... Ci1}, L2={Ci1+1, ... Ci2} ..., Lk={Ci(k−1)+1, ... Cn} such that the length of the set Lj is <=P(1−ORG), where P is the number of sites and Lj is maximal.

The PipeBinPack method takes all operator clones in a given pipeline and tries to schedule them:

```
 1: void
 2: PipeLine::PipeBinPack(
 3:     SsgGlobalResource    *ssg,
 4:     OptPool              *phdr)
 5: {
 6:    MacroCloneListIterType iter;
 7:    MacroClone             *mac_clone;
 8:    PsCostUnitType         min_nps_cost;
 9:    PsCostUnitType         nps_cost;
10:    int32                  cheapest_site_num;
11:    int32                  site_num;
12:
13:    // Sort the macro clones in the pipeline according to
14:    // a specific ordering
15:
16:    PipeMacCloneSort( );
17:
18:    // Initialize the NPS resource usage
19:    ssg->SsgNpsResInit( );
20:
21:    // Now pin the floating macroclones
22:
23:    for (iter = _macrocloneset.begin( ); iter != _macrocloneset.end( );
24:         ++iter)
25:    {
26:       mac_clone = *iter;
27:
28:       if (mac_clone->MclsPinnedToSite( ))
29:       {
30:          // Those that have been pinned need not be
31:          // considered again
32:          continue;
33:       }
34:       min_nps_cost = NpsResource::TS_INFINITY;
35:       for (int32 i = 0; i < ssg->SsgGetNumSites( ); i++)
36:       {
37:          if (mac_clone->McSatisfied(
38:               ssg->SsgGetNpsResAvail(i),
39:               ssg->SsgGetNpsResUsed(i)))
40:          {
41:             if ((nps_cost =
42:       mac_clone->McGetNpsResource( )->
43:               getResLength(
44:                  ssg->
45:                  SsgGetNpsResUsed(i))) <
46:                  min_ps_cost)
47:             {
48:                min_nps_cost = nps_cost;
49:                cheapest_site_num = i;
50:             }
51:          }
52:       }
53:    }
54:    if (min_nps_cost == NpsResource::TS_INFINITY)
55:    {
56:       // i.e. we have not been able to schedule this
57:       // clone; this is an error
58:       SYB_ASSERT(FALSE);
59:    }
60:    else
61:    {
62:       mac_clone->McSetSiteId(
63:          ssg->SsgGetSiteId(cheapest_site_num));
64:       ssg->SsgGetPsResUsed(cheapest_site_num)->
65:          setUnionVec(
66:             mac_clone->McGetPsResource( ));
67:       ssg->SsgGetNpsResUsed(cheapest_site_num)->
68:          setUnionVec(
69:             mac_clone->McGetNpsResource( ));
70:       }
71:    }
72: }
```

The PipeBinPack method takes all operator clones in a given pipeline and tries to schedule them based on bin packing algorithm. There is a minimal sufficiency condition for a pipeline to be fully schedulable.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system, a method for parallel optimization of a query, the method comprising:

generating a plurality of parallel plans for obtaining data requested by the query, the parallel plans including parallel operators for executing portions of the query in parallel;

adjusting parallel operators of each parallel plan based on maximum number of threads available for executing the query, wherein said maximum number of threads is user configurable;

creating a schedule for each parallel plan indicating a sequence for execution of operators of each parallel plan, wherein the schedule is created based upon dependencies among operators of each parallel plan and resources available for executing the query and includes identifying pipelines of operators in each parallel plan based upon dependencies among operators of each parallel plan, determining resource usage of each pipeline and splitting a particular pipeline having resource usage greater than resources available for executing the particular pipeline into a plurality of pipelines by adding operators for performing operations in parallel so that resource usage is distributed over the plurality of pipelines;

determining execution cost of each parallel plan based on its schedule; and returning a result of a particular parallel plan having lowest execution cost for obtaining data requested by the query.

2. The method of claim 1, wherein the query comprises a Structured Query Language (SQL) expression.

3. The method of claim 1, wherein said generating step includes generating an operator tree for each parallel plan based on the query.

4. The method of claim 3, wherein said step of generating an operator tree includes generating nodes of the operator tree as iterators for applying predefined behavior to data.

5. The method of claim 3, wherein said step of generating an operator tree includes inserting a parallel operator in the operator tree.

6. The method of claim 5, wherein said step of generating an operator tree includes dividing a query operation into sub-tasks and said parallel operator provides for executing said sub-tasks in parallel.

7. The method of claim 6, wherein said parallel operator provides for executing said sub-tasks in parallel across a plurality of storage units.

8. The method of claim 6, wherein said parallel operator provides for executing said sub-tasks in parallel across a plurality of CPUs.

9. The method of claim 5, wherein said parallel operator provides for pipelining of intermediate results from a first set of operators to a second set of operators.

10. The method of claim 1, wherein said generating step includes generating a parallel plan using a partitioning property so as to partition data among operators of the parallel plan.

11. The method of claim 1, wherein said generating step includes generating a cost vector for each parallel plan.

12. The method of claim 11, wherein said cost vector includes as components a selected one or more of work done by a processor in a given time, execution time of an operator in the parallel plan, and resource usage of an operator in the parallel plan for a certain time period.

13. The method of claim 11, wherein said generating step further comprises:

pruning a first parallel plan having a cost vector costing more in each vector dimension than a second parallel plan.

14. The method of claim 1, wherein said generating step includes generating a plurality of parallel plans based at least in part on partitioning and multi-dimensional costing.

15. The method of claim 1, wherein said adjusting step includes adjusting a parallel plan based on maximum number of threads available at compile time.

16. The method of claim 1, wherein said step of adjusting parallel operators of each parallel plan further comprises:

adjusting parallel operators based on available memory resources.

17. The method of claim 1, wherein said creating step includes constructing a pipeline dependency tree based on dependencies among operators of each parallel plan.

18. The method of claim 17, wherein said creating step includes determining order of execution of pipelines based on the pipeline dependency tree and available resources.

19. The method of claim 1, wherein said step of splitting the particular pipeline includes adding operators for materializing the particular pipeline into a plurality of pipelines at intervals such that resource usage is evenly distributed over the plurality of pipelines.

20. A computer-readable medium having processor-executable instructions for performing the method of claim 1.

21. A downloadable set of processor-executable instructions for performing the method of claim 1.

22. A system for parallel optimization of a database query, the system comprising:

a search engine for generating a plurality of parallel plans which can be used for obtaining data requested by the query, the parallel plans including parallel operators for executing portions of the query in parallel;

a parallel scheduler for adjusting parallel operators of each parallel plan based on maximum number of threads available for executing the query and creating a schedule for the parallel plan indicating a sequence for execution of operators of the parallel plan, wherein the maximum number of threads is user configurable and wherein the schedule is created based upon dependencies among operators of each parallel plan and resources available for executing the query and the parallel scheduler identifies pipelines of operators in each parallel plan based upon dependencies among operators of each parallel plan, determines resource usage of each pipeline and splits a particular pipeline having resource usage greater than resources available for executing the particular pipeline into a plurality of pipelines by adding operators for performing operations in parallel so that resource usage is distributed over the plurality of pipelines; and a module for determining execution cost of each parallel plan based on its schedule, and returning a result of a particular parallel plan having lowest execution cost for obtaining data requested by the query.

23. The system of claim 22, wherein the query comprises a Structured Query Language (SQL) expression.

24. The system of claim 22, wherein the search engine generates an operator tree for each parallel plan based on the query.

25. The system of claim 24, wherein the search engine generates nodes of the operator tree as iterators for applying predefined behavior to data.

26. The system of claim 24, wherein the search engine inserts a parallel operator in the operator tree.

27. The system of claim 26, wherein the search engine divides a query operation into sub-tasks and said parallel operator provides for executing said sub-tasks in parallel.

28. The system of claim 27, wherein said parallel operator provides for executing said sub-tasks in parallel across a plurality of storage units.

29. The system of claim 27, wherein said parallel operator provides for executing said sub-tasks in parallel across a plurality of CPUs.

30. The system of claim 26, wherein said parallel operator provides for pipelining of intermediate results from a first set of operators to a second set of operators.

31. The system of claim 22, wherein the search engine generates a parallel plan using a partitioning property so as to partition data among operators of the parallel plan.

32. The system of claim 22, wherein the search engine generates a cost vector for each parallel plan.

33. The system of claim 32, wherein said cost vector includes as components a selected one or more of work done by a processor in a given time, execution time of an operator in the parallel plan, and resource usage of an operator in the parallel plan for a certain time period.

34. The system of claim 32, wherein the search engine prunes a first parallel plan having a cost vector costing more in each vector dimension than a second parallel plan.

35. The system of claim 22, wherein the search engine generates a plurality of parallel plans based at least in part on partitioning and multi-dimensional costing.

36. The system of claim 22, wherein the parallel scheduler adjusts a parallel plan based on maximum number of threads available at compile time.

37. The system of claim 22, wherein the parallel scheduler constructs a pipeline dependency tree based on dependencies among operators of a parallel plan.

38. The system of claim 37, wherein the parallel scheduler determines order of execution of pipelines based on the pipeline dependency tree and available resources.

39. The system of claim 22, wherein said parallel scheduler adds operators for materializing the particular pipeline into a plurality of pipelines at intervals such that resource usage is evenly distributed over the plurality of pipelines.

40. A method for parallel optimization of a query requesting data from a database, the method comprising:
creating a plurality of operator trees for executing the query, the operator trees providing for execution of portions of the query in parallel;
adjusting the portions of the query to be executed in parallel based on maximum number of threads available for executing the query, wherein said maximum number of threads is user configurable;
generating a schedule for execution of each operator tree based upon dependencies among operators of each operator tree and resources available for executing the query including identifying pipelines of operators in each operator tree based upon dependencies among operators of each operator tree, determining resource usage of each pipeline and splitting a particular pipeline having resource usage greater than resources available for executing the particular pipeline into a plurality of pipelines by adding operators for performing operations in parallel so that resource usage is distributed over the plurality of pipelines; and
returning a result indicating the operator tree having lowest execution cost based on its schedule for executing the query with available resources.

41. The method of claim 40, wherein the query comprises a Structured Query Language (SQL) expression.

42. The method of claim 40, wherein said creating step includes creating an operator tree including parallel operators for execution of portions of the query in parallel.

43. The method of claim 42, wherein said parallel operators comprise iterators for applying predefined behavior to data.

44. The method of claim 42, wherein said step of creating an operator tree includes creating operators for tasks to be performed in executing the query and said parallel operators provides for executing said tasks in parallel.

45. The method of claim 42, wherein a parallel operator executes in parallel across a plurality of storage units.

46. The method of claim 42, wherein a parallel operator executes in parallel across a plurality of CPUs.

47. The method of claim 42, wherein a parallel operator provides for pipelining of intermediate results from a first set of operators to a second set of operators.

48. The method of claim 40, wherein said creating step includes creating an operator tree using a partitioning property so as to partition data among operators.

49. The method of claim 40, wherein said creating step includes generating a cost vector for each operator tree.

50. The method of claim 49, wherein said cost vector includes as components a selected one or more of work done by a processor in a given time, execution time of an operator, and resource usage of an operator for a certain time period.

51. The method of claim 49, wherein said creating step further comprises:
pruning a first operator tree having a cost vector costing more in each vector dimension than a second operator tree.

52. The method of claim 40, wherein said creating step includes creating a plurality of operator trees based at least in part on partitioning and multi-dimensional costing.

53. The method of claim 40, wherein said adjusting step includes adjusting an operator tree for maximum number of threads available at compile time.

54. The method of claim 40, wherein said operator tree includes parallel operators for executing portions of the query in parallel and said adjusting step further comprises: adjusting said parallel operators if necessary based on available memory resources.

55. The method of claim 40, wherein said generating step includes constructing a pipeline dependency tree based on dependencies among operators of each operator tree.

56. The method of claim 55, wherein said creating step includes determining order of execution of pipelines based on the pipeline dependency tree and available resources.

57. The method of claim 40, wherein said step of splitting the particular pipeline includes adding operators for materializing the particular pipeline into a plurality of pipelines at intervals such that resource usage is evenly distributed over the plurality of pipelines.

58. A computer-readable medium having processor-executable instructions for performing the method of claim 40.

59. A downloadable set of processor-executable instructions for performing the method of claim 40.

* * * * *